(12) United States Patent
Harada et al.

(10) Patent No.: US 10,168,464 B2
(45) Date of Patent: Jan. 1, 2019

(54) LIGHTING DEVICE, DISPLAY DEVICE, AND TELEVISION DEVICE

(71) Applicant: Sharp Kabushiki Kaisha, Sakai, Osaka (JP)

(72) Inventors: Masanobu Harada, Sakai (JP); Keitaro Matsui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/554,224

(22) PCT Filed: Mar. 11, 2016

(86) PCT No.: PCT/JP2016/057734
§ 371 (c)(1),
(2) Date: Aug. 29, 2017

(87) PCT Pub. No.: WO2016/148053
PCT Pub. Date: Sep. 22, 2016

(65) Prior Publication Data
US 2018/0081105 A1    Mar. 22, 2018

(30) Foreign Application Priority Data

Mar. 18, 2015    (JP) .................................. 2015-054628

(51) Int. Cl.
*F21V 8/00* (2006.01)
*F21V 9/40* (2018.01)
(Continued)

(52) U.S. Cl.
CPC ................ *G02B 6/005* (2013.01); *F21S 2/00* (2013.01); *F21V 9/08* (2013.01); *F21V 9/30* (2018.02);
(Continued)

(58) Field of Classification Search
CPC .. G02F 1/133308; H04N 5/655; G02B 6/005; G02B 6/0053; G02B 6/0055;
(Continued)

(56) References Cited

U.S. PATENT DOCUMENTS

2006/0255711 A1* 11/2006 Dejima ................ G02B 6/0023
313/485
2010/0167011 A1    7/2010 Dubrow
(Continued)

FOREIGN PATENT DOCUMENTS

JP    2013-544018 A    12/2013
KR    10-2015-0025651 A    3/2015

*Primary Examiner* — Laura Gudorf
(74) *Attorney, Agent, or Firm* — Keating & Bennett, LLP

(57) ABSTRACT

A backlight unit (lighting device) 12 includes LEDs (light source) 17, a light guide plate 19 including a light entry end surface 19*b* on at least a part of an outer peripheral end surface and a light output plate surface 19*a* on a plate surface, and a wavelength conversion sheet (wavelength conversion member) 20 disposed so as to overlap the light output plate surface 19*a* of the light guide plate 19 and containing a phosphor for wavelength-converting the light from the LEDs 17. Light from the LED 17 enters through the light entry end surface 19*b* and exits through the light output plate surface 19*a*. The wavelength conversion sheet 20 includes an increased phosphor portion 27 on at least a part of outer peripheral side portions 20OP thereof and the increased phosphor portion 27 has a phosphor content per unit area that is greater than that in a central portion 20IP.

6 Claims, 23 Drawing Sheets

(51) Int. Cl.
*F21V 9/30* (2018.01)
*F21S 2/00* (2016.01)
*F21V 9/08* (2018.01)
*G02F 1/1333* (2006.01)
*H04N 5/655* (2006.01)

(52) U.S. Cl.
CPC ............... *F21V 9/40* (2018.02); *G02B 6/009* (2013.01); *G02B 6/0053* (2013.01); *G02B 6/0055* (2013.01); *G02B 6/0056* (2013.01); *G02B 6/0068* (2013.01); *G02B 6/0088* (2013.01); *G02B 6/0091* (2013.01); *G02F 1/133308* (2013.01); *H04N 5/655* (2013.01)

(58) Field of Classification Search
CPC ...... G02B 6/0056; G02B 6/0068; G02B 6/88; G02B 6/009; G02B 6/0091
See application file for complete search history.

(56) References Cited

U.S. PATENT DOCUMENTS

| | | |
|---|---|---|
| 2012/0113672 A1 | 5/2012 | Dubrow et al. |
| 2013/0075014 A1 | 3/2013 | Dubrow |
| 2014/0178648 A1 | 6/2014 | Dubrow |
| 2015/0177538 A1* | 6/2015 | Jepsen .................. G09G 3/20 345/690 |
| 2015/0300600 A1 | 10/2015 | Dubrow et al. |
| 2016/0009988 A1 | 1/2016 | Dubrow |
| 2016/0054624 A1* | 2/2016 | Cho .................. G02F 1/133605 349/58 |
| 2016/0349428 A1 | 12/2016 | Dubrow et al. |
| 2016/0363713 A1 | 12/2016 | Dubrow et al. |

* cited by examiner

LIGHTING DEVICE, DISPLAY DEVICE, AND TELEVISION DEVICE

TECHNICAL FIELD

The present invention relates to a lighting device, a display device, and a television device.

BACKGROUND ART

An example of a conventionally-known liquid crystal display device is disclosed in Patent Document 1 below. The liquid crystal display device described in Patent Document 1 includes a liquid crystal panel and a display backlight unit that irradiates the liquid crystal panel with light. The display backlight unit includes a primary light source, a light guide plate for guiding primary light emitted by the primary light source, and a remote phosphor film containing a QD phosphor material which is excited by the primary light guided by the light guide plate to emit secondary light.

PRIOR ART DOCUMENT

Patent Document

Patent Document 1: Japanese Translation of PCT International Application Publication No. 2013-544018

Problem to be Solved by the Invention

Use of the remote phosphor film as described in Patent Document 1 above for an edge light backlight unit may lead to the following problem. Specifically, the edge light backlight includes a light source and a light guide plate for guiding light from the light source. The light guide plate includes a light entry end surface that the light from the light source directly enters, a no-light entry end surface that the light from the light source does not directly enter, and a light output plate surface for causing light to be emitted. The light propagating in the light guide plate is not necessarily entirely emitted from the light output plate surface, and some of the light may be emitted from the no-light entry end surface. Since the light emitted from the no-light entry end surface is difficult to be wavelength-converted by the remote phosphor film, the light of the light source may be emitted without wavelength conversion. As a result, a difference in color tint of output light has been likely to occur between the outer peripheral side and the center of the edge light backlight unit.

DISCLOSURE OF THE PRESENT INVENTION

The present invention was made in view of the above circumstances, and an object of the present invention is to suppress the occurrence of color irregularity.

Means for Solving the Problem

A lighting device according to the present invention includes: a light source; a light guide plate including a light entry end surface on at least a part of an outer peripheral end surface, the light entry end surface through which light from the light source enters, the light guide plate including a light output plate surface on a plate surface, the light output plate surface through which the light exits; and a wavelength conversion member disposed so as to overlap the light output plate surface of the light guide plate, and containing a phosphor for wavelength-converting the light from the light source, the wavelength conversion member including an increased phosphor portion on at least a part of an outer peripheral side portion thereof, the increased phosphor portion having a phosphor content per unit area that is greater than that in a central portion of the wavelength conversion member.

In this way, the light emitted from the light source enters the light entry end surface of the outer peripheral end surface of the light guide plate, propagates through the inside of the light guide plate, and then exits the light output plate surface. The light emitted from the light output plate surface of the light guide plate is wavelength-converted by the phosphor contained in the wavelength conversion member overlapping the light output plate surface. The light propagating in the light guide plate is not necessarily entirely emitted from the light output plate surface, and some of the light may be emitted from the outer peripheral end surface of the light guide plate. In addition, the light propagating in the light guide plate includes retroreflected light that, after having been emitted from the light output plate surface, returns into the light guide plate. The retroreflected light tends to have a smaller number of times of reflections on the outer peripheral side of the light guide plate than in the center thereof. Accordingly, the retroreflected light emitted from the outer peripheral side (including the outer peripheral end surface) of the light guide plate has a color tint closer to the color tint of the light of the light source compared with the retroreflected light emitted from the center of the light guide plate. In this respect, the wavelength conversion member includes, in at least a part of the outer peripheral side portion thereof, the increased phosphor portion in which the phosphor content per unit area is greater than in the central portion. Accordingly, at least a part of the light emitted from the outer peripheral side of the light guide plate (including the outer peripheral end surface) can be wavelength-converted with higher efficiency by the increased phosphor portion. In this way, the color tint difference in output light between the center and the outer peripheral sides of the lighting device can be made difficult to occur, whereby the occurrence of color irregularity is suppressed.

The present invention may include the following preferable embodiments.

(1) The wavelength conversion member may include a protruding portion having the outer peripheral side portion that is outside the outer peripheral end surface of the light guide plate, and at least the protruding portion may include the increased phosphor portion. In this way, the light emitted from the outer peripheral end surface of the light guide plate can be efficiently wavelength-converted by the increased phosphor portion included in the protruding portion of the wavelength conversion member, whereby the color irregularity can be preferably suppressed.

(2) The wavelength conversion member may include the increased phosphor portion in the protruding portion and a portion inside the protruding portion in the outer peripheral side portion. In this way, in addition to the light emitted from the outer peripheral end surface of the light guide plate, but also the light emitted from an outer end portion of the light output plate surface of the light guide plate can be efficiently wavelength-converted by the increased phosphor portion spanning between the protruding portion and the portion on inside the protruding portion of the wavelength conversion member, whereby the color irregularity can be preferably suppressed.

(3) The wavelength conversion member may include a side portion in which the outer peripheral side portion linearly extends; the side portion may include the increased phosphor portion; and the increased phosphor portion may have an end portion and a central portion with respect to an extending direction of the side portion, and the phosphor content per unit area may be greater in the end portion than in the central portion. The amount of the light emitted from the outer peripheral end surface of the light guide plate tends to be greater in and around the end portion, with respect to the extending direction, of the side portion of the outer peripheral side portion of the wavelength conversion member, than in and around the central portion. In this respect, the increased phosphor portion is configured such that the phosphor content per unit area is greater in the end portion, with respect to the extending direction, of the side portion than in the central portion. Accordingly, the light emitted from the outer peripheral end surface of the light guide plate around, the end portion, with respect to the extending direction, of the side portion of the outer peripheral side portion of the wavelength conversion member can be efficiently wavelength-converted by the phosphor, which is included in greater amounts in the increased phosphor portion, whereby the color irregularity can be preferably suppressed.

(4) The light guide plate may include a no-light entry end surface in a portion of the outer peripheral end surface except for the light entry end surface, the light from the light source do not directly enter through the no-light entry end surface. The wavelength conversion member may include the increased phosphor portion in at least a part of a portion of the outer peripheral side portion along the no-light entry end surface. The light emitted from the light source, entering the light entry end surface of the light guide plate, and then propagating in the light guide plate is emitted in greater amounts via, in particular, the no-light entry end surface of the outer peripheral end surface of the light guide plate. In this respect, the increased phosphor portion is included in at least a part of the portion of the outer peripheral side portion of the wavelength conversion member along the no-light entry end surface. Accordingly, the light emitted from the no-light entry end surface can be efficiently wavelength-converted by the increased phosphor portion, whereby the color irregularity can be preferably suppressed.

(5) The wavelength conversion member may include a plate surface-side wavelength conversion portion disposed so as to overlap the light output plate surface of the light guide plate, and an end surface-side wavelength conversion portion disposed so as to overlap at least a part of the no-light entry end surface of the light guide plate. The end surface-side wavelength conversion portion may include the increased phosphor portion. In this way, the light emitted from the light output plate surface of the light guide plate is wavelength-converted by the plate surface-side wavelength conversion portion of the wavelength conversion member, whereas the light emitted from the no-light entry end surface of the light guide plate is wavelength-converted by the end surface-side wavelength conversion portion of the wavelength conversion member. Because the end surface-side wavelength conversion portion includes the increased phosphor portion, the light emitted from the no-light entry end surface of the light guide plate can be more efficiently wavelength-converted by the increased phosphor portion, whereby the color irregularity can be suppressed more preferably.

(6) The wavelength conversion member may include the increased phosphor portion in an entire area of the portion of the outer peripheral side portion along the no-light entry end surface. In this way, the light emitted from the no-light entry end surface of the light guide plate can be even more efficiently wavelength-converted by the increased phosphor portion, whereby the color irregularity can be suppressed even more preferably.

(7) The wavelength conversion member may include the increased phosphor portion in an entire area of the outer peripheral side portion. In this way, the light emitted from the outer peripheral end surface of the light guide plate can be even more efficiently wavelength-converted by the increased phosphor portion, whereby the color irregularity can be suppressed in a more preferable manner.

(8) The wavelength conversion member may include a pair of side portions in the outer peripheral side portion, the side portions may extend linearly to be parallel to each other, and each of the pair of side portions may include the increased phosphor portion. In this way, when the increased phosphor portion is selectively disposed in the outer peripheral side portion of the wavelength conversion member, the increased phosphor portion may be provided linearly in each of the pair of side portions. Accordingly, the manufacture of the wavelength conversion member is facilitated, and the manufacturing cost of the wavelength conversion member can be preferably reduced.

(9) The wavelength conversion member may have a phosphor distribution density higher in the increased phosphor portion than in the central portion. In this way, during the manufacture of the wavelength conversion member, the increased phosphor portion can be provided by, for example, coating at least apart of the outer peripheral side portion and the central portion with phosphors having different distribution densities.

(10) The wavelength conversion member may include a phosphor layer containing the phosphor; and the phosphor layer in the increased phosphor portion maybe thicker than the phosphor layer in the central portion. In this way, during the manufacture of the wavelength conversion member, the increased phosphor portion can be provided by, for example, coating at least a part of the outer peripheral side portion with a greater amount of phosphor than for the central portion.

(11) The light source may emit blue light; the wavelength conversion member may contain, as the phosphor, at least one of a green phosphor that wavelength-converts the blue light into green light and a red phosphor that wavelength-converts the blue light into red light, or a yellow phosphor that wavelength-converts the blue light into yellow light. In this way, the blue light emitted from the light source is wavelength-converted into green light and red light when the wavelength conversion member contains the green phosphor and red phosphor, or into yellow light when the yellow phosphor is contained. In this case, even if the light emitted from the outer peripheral side of the light guide plate has a blue tint, at least a part of the light can be wavelength-converted into green light and red light or yellow light with higher efficiency by the increased phosphor portion, whereby the occurrence of color irregularity is suppressed.

(12) The wavelength conversion member may contain a quantum dot phosphor as the phosphor. In this way, the light wavelength conversion efficiency of the wavelength conversion member is increased, and the chromatic purity of the wavelength-converted light is increased.

In order to solve the problem, a display device according to the present invention includes the lighting device described above; and a display panel that displays an image by utilizing light emitted from the lighting device. In the display device having such a configuration, because the occurrence of color irregularity in the output light from the lighting device is suppressed, a display with excellent display quality can be achieved.

Furthermore, in order to solve the problem, a television device according to the present invention includes the display device described above. The television device, in which the display device has excellent display quality, can achieve a display of a television image with excellent display quality.

Advantageous Effect of the Invention

According to the present invention, the occurrence of color irregularity can be suppressed.

MODE FOR CARRYING OUT THE INVENTION

<First Embodiment>

A first embodiment of the present invention will be described with reference to FIG. 1 to FIG. 7. In the present embodiment, a backlight unit 12 and a liquid crystal display device 10 using the backlight unit 12 will be described by way of example. In some of the drawings, the X-axis, the Y-axis, and the Z-axis are shown, the axis directions being drawn to correspond to the directions shown in the respective drawings. Further, the upper side of FIG. 4 and FIG. 5, for example, is referred to as the front side, and the lower side as the back side.

Figure 1:
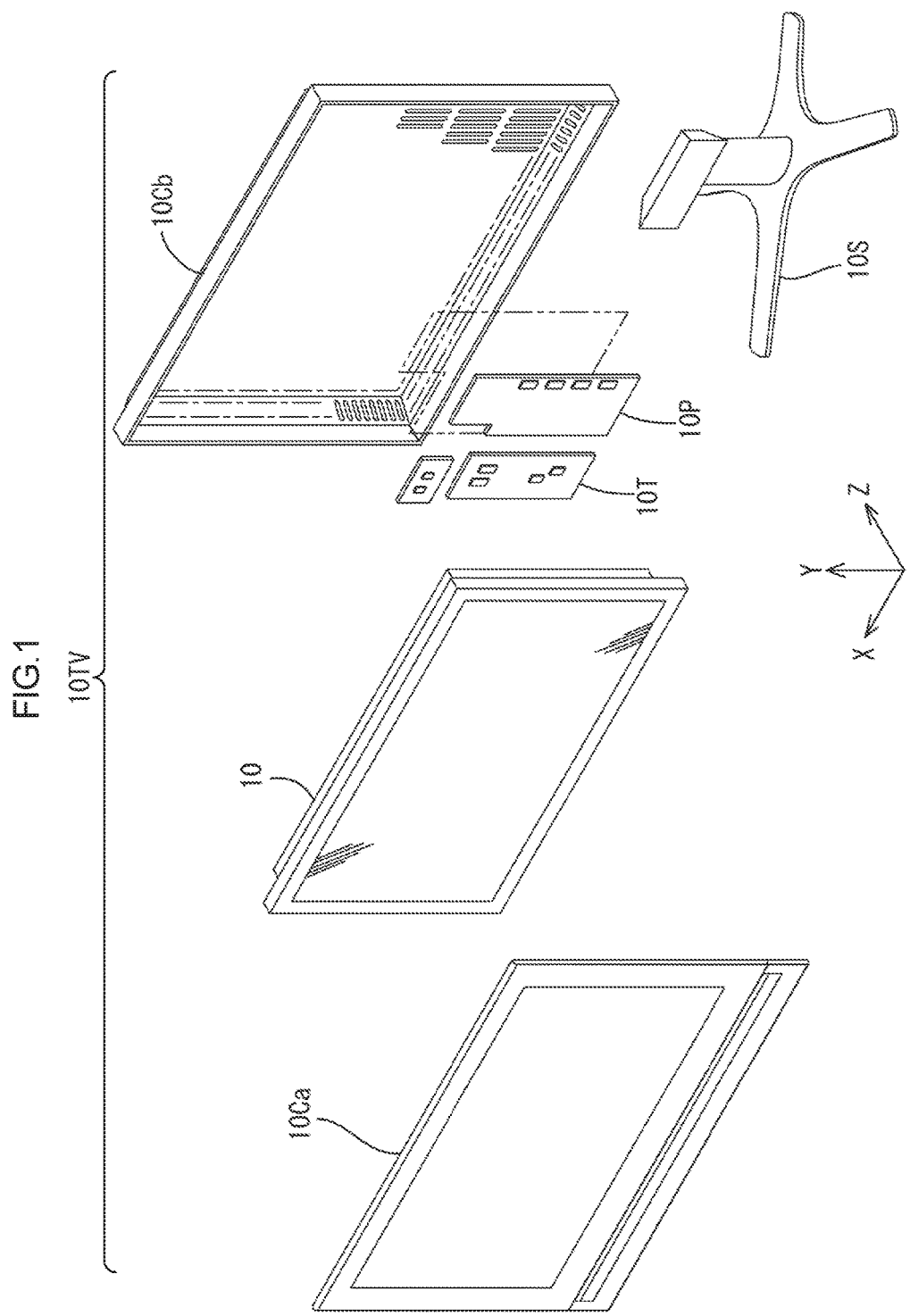
FIG. 1 is an exploded perspective view illustrating a schematic configuration of a television device according to a first embodiment of the present invention.
Figure 2:
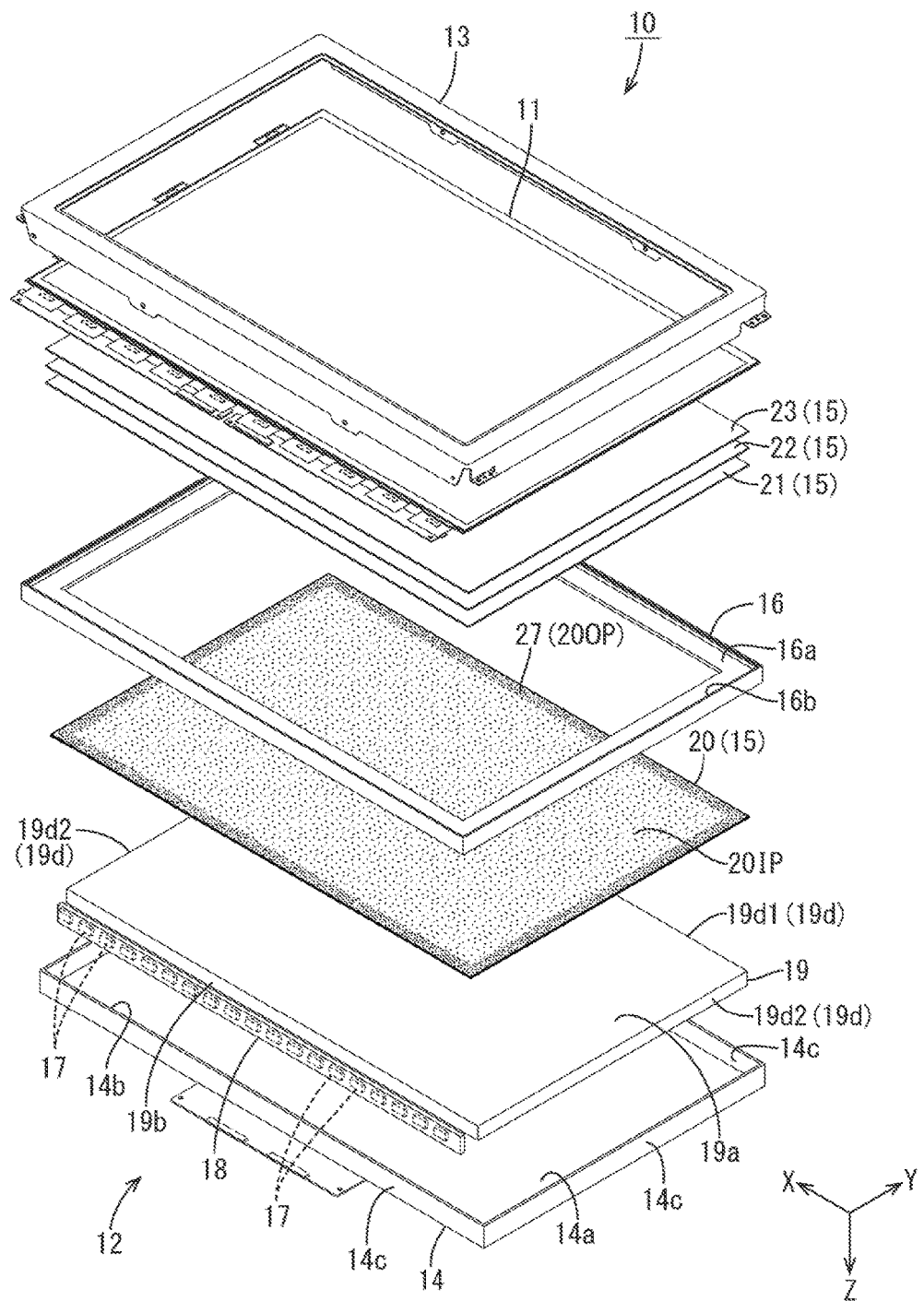
FIG. 2 is an exploded perspective view illustrating a schematic configuration of a liquid crystal display device provided in the television device.

As illustrated in FIG. 1, the television device 10TV according to the present embodiment includes: the liquid crystal display device 10; front and back cabinets 10Ca and 10Cb housing the liquid crystal display device 10 in a sandwiched manner; a power supply 10P; a tuner (receiving unit) 10T for television signal reception; and a stand 10S. The liquid crystal display device (display device) 10 has a generally laterally elongated (longitudinal) square shape (rectangular shape), and is housed in a vertically placed state. As illustrated in FIG. 2, the liquid crystal display device 10 includes a liquid crystal panel 11 as a display panel for displaying an image, and a backlight unit (lighting device) 12 as an external light source for supplying light for display to the liquid crystal panel 11, which are integrally held by a frame-like bezel 13 or the like.

Next, the liquid crystal panel 11 and the backlight unit 12 constituting the liquid crystal display device 10 will be described in order. The liquid crystal panel (display panel) 11 has a laterally elongated rectangular shape as viewed in plan, and includes a pair of glass substrates bonded together, with a predetermined gap therebetween, and a liquid crystal layer (not shown) sealed between the glass substrates. The liquid crystal layer contains liquid crystal molecules, which are a substance whose optical characteristics are changed by application of an electric field. On the inner surface side of one glass substrate (array substrate, active matrix substrate), there are provided, for example: switching elements (for example, TFTs) and pixel electrodes, the switching elements being connected to mutually orthogonal source wires and gate wires, the pixel electrodes being arranged in a rectangular region surrounded by source wires and gate wires and which are connected to the switching elements. The switching elements and the pixel electrodes are arranged in a planar matrix configuration; and an alignment film. On the inner surface side of the other glass substrate (opposite substrate, CF substrate), there are provided: a color filter in which colored portions of R (red), G (green), B (blue) and the like are arranged in a planar matrix configuration in a predetermined arrangement; a light shielding layer (black matrix) arranged between the colored portions and forming a lattice shape; a solid counter electrode opposed to the pixel electrodes; and an alignment film. Polarizing plates are disposed on the outer surface sides of both glass substrates, respectively. In addition, the long side direction of the liquid crystal panel 11 coincides with the X-axis direction, the short side direction coincides with the Y-axis direction, and the thickness direction coincides with the Z-axis direction.

As illustrated in FIG. 2, the backlight unit 12 includes a substantially box-shaped chassis 14 having a light emitting portion 14b opening toward the front side (liquid crystal panel 11 side) and optical members (optical sheets) 15 arranged so as to cover the light emitting portion 14b of the chassis 14. Furthermore, the chassis 14 houses: LEDs 17 as a light source; an LED substrate 18 on which the LEDs 17 are mounted; a light guide plate 19 for guiding light from the LEDs 17 to the optical members 15 (liquid crystal panel 11); and a frame 16 for pressing the light guide plate 19 and the like from the front side. In the backlight unit 12, the LED substrate 18 is disposed in one of a pair of end portions on the long sides (the front side in FIGS. 2 and 3, the left side in FIG. 4), so that the LEDs 17 mounted on the LED substrate 18 are displaced toward one of the long side ends of the liquid crystal panel 11. Thus, the backlight unit 12 according to the present embodiment is an edge light (side light) backlight unit which is of a one-side light entry type in which the light of the LEDs 17 enters the light guide plate 19 only from one side. Subsequently, each component of the backlight unit 12 will be described in detail.

Figure 3:
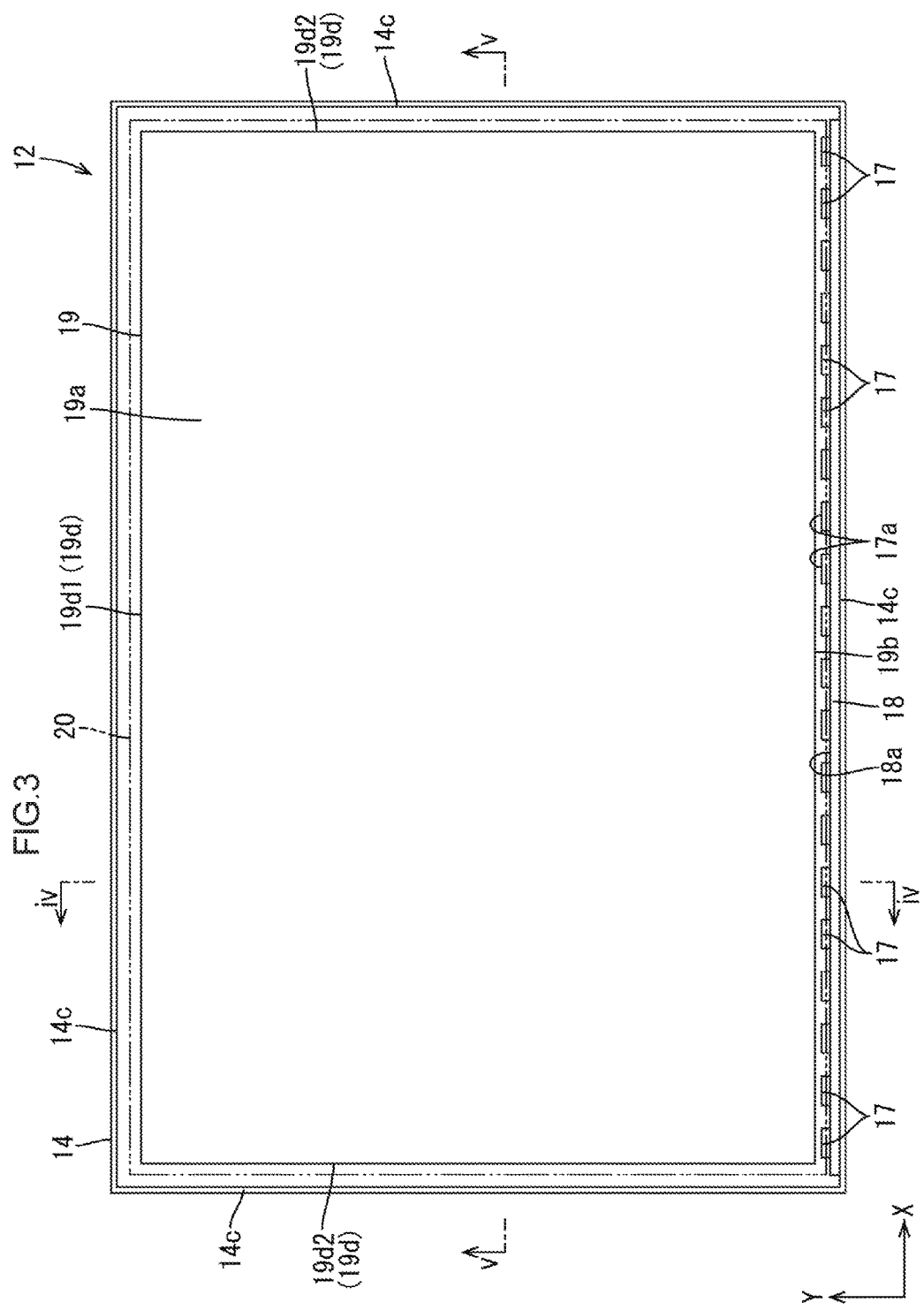
FIG. 3 is a plan view of a backlight unit provided in the liquid crystal display device.

The chassis 14 is made of metal, and as illustrated in FIGS. 2 and 3, includes: a bottom portion 14a having a laterally elongated rectangular shape similar to the liquid crystal panel 11; and side portions 14c rising from the outer end of each side of the bottom portion 14a. The chassis 14 has a shallow box shape that opens toward the front as a whole. The long side direction of the chassis 14 (the bottom portion 14a) coincides with the X-axis direction (horizontal direction), and the short side direction coincides with the Y-axis direction (vertical direction). Further, the frame 16 and the bezel 13 can be fixed to the side portions 14c.

Figure 4:
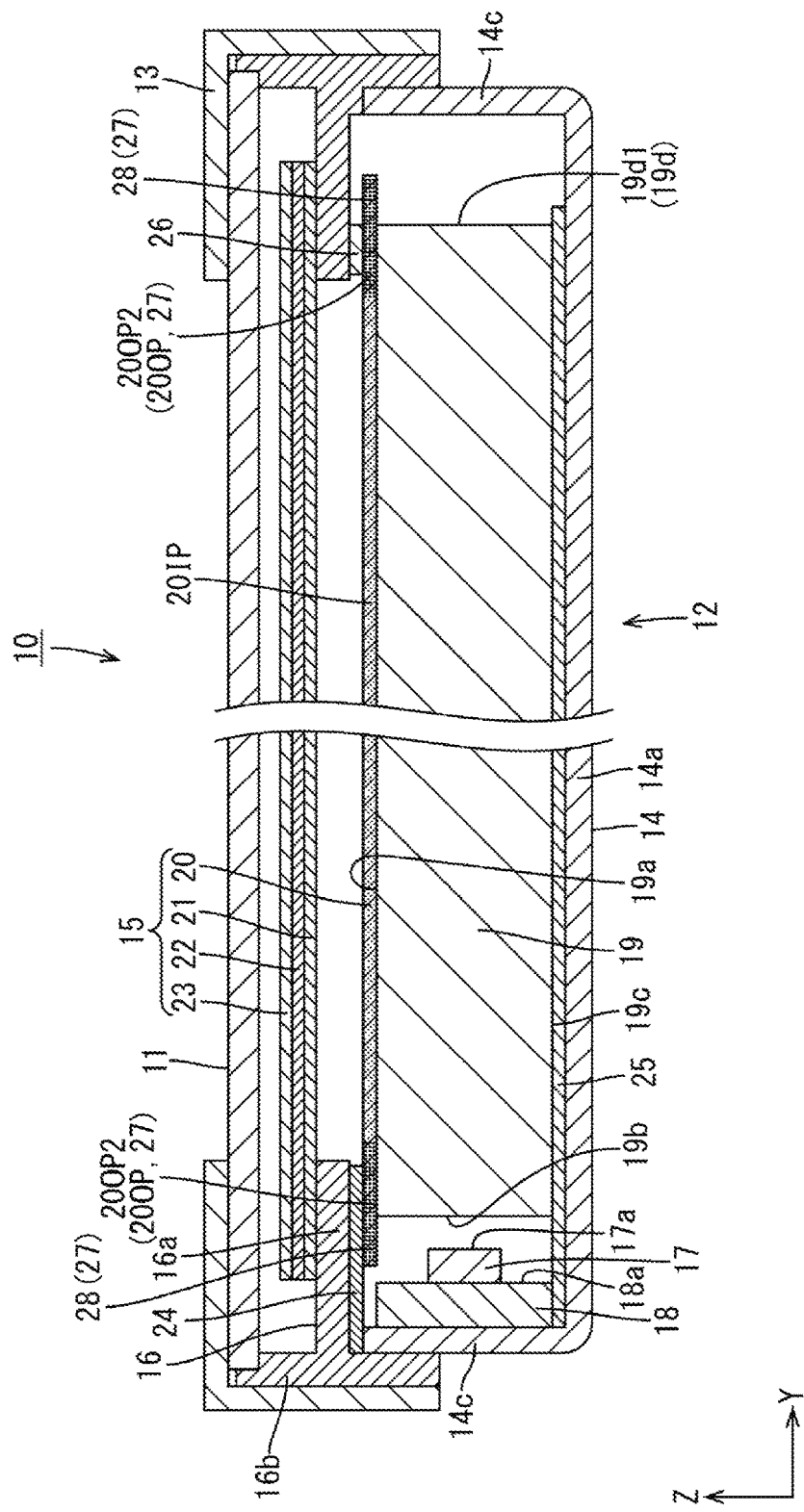
FIG. 4 is a cross sectional view taken along line iv-iv of FIG. 3.
Figure 5:
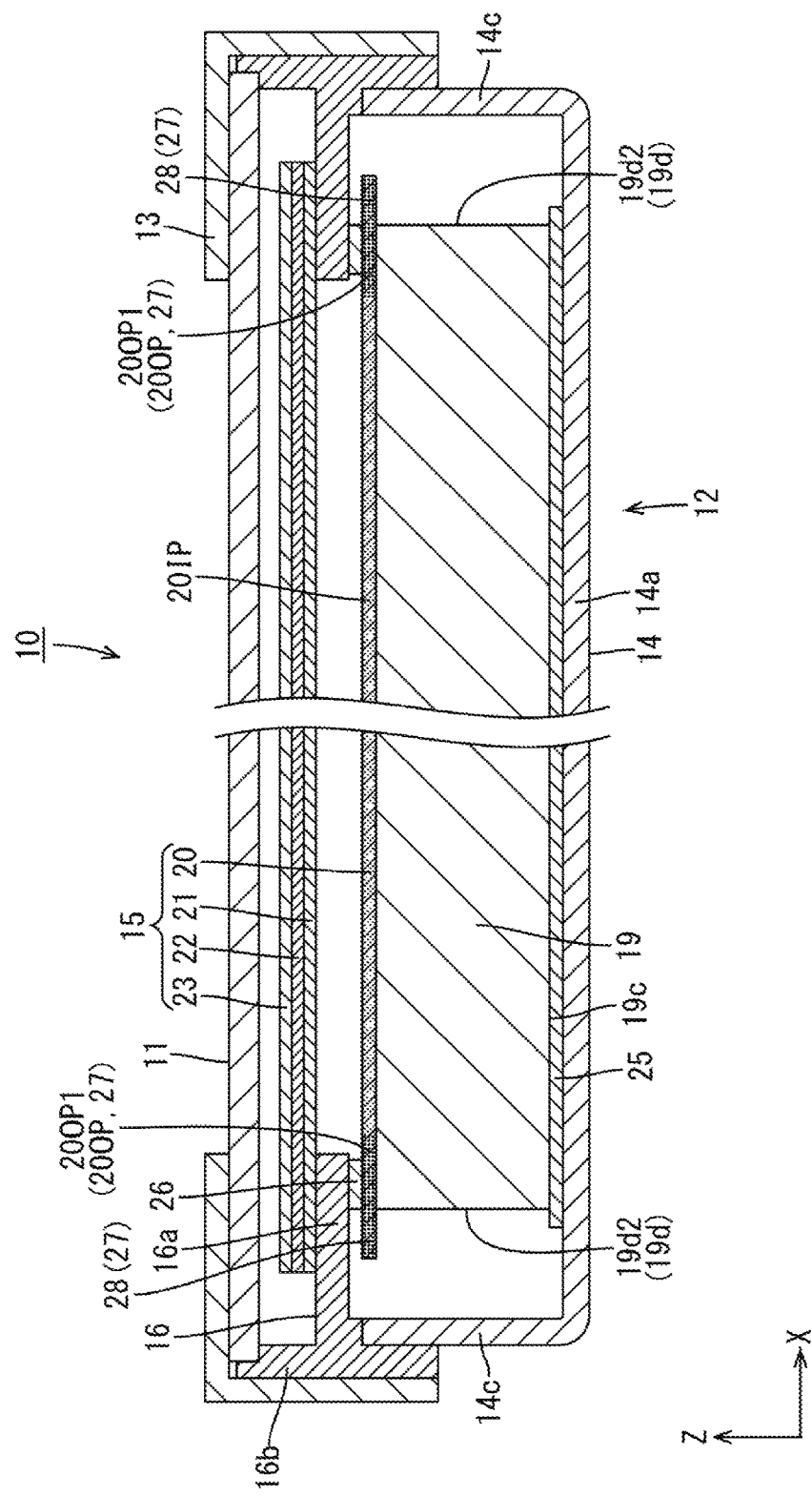
FIG. 5 is a cross sectional view taken along line v-v of FIG. 3.

As illustrated in FIG. 2, the optical members 15 have a laterally elongated rectangular shape as viewed in plan, similar to the liquid crystal panel 11 and the chassis 14. The optical members 15 cover the light emitting portion 14b of the chassis 14 and are interposed between the liquid crystal panel 11 and the light guide plate 19. The optical members 15 are in the form of a sheet, and include a total of four optical members. Specifically, the optical members 15 include: a wavelength conversion sheet (wavelength conversion member) 20 that wavelength-converts the light (primary light) emitted from the LEDs 17 to light of another wavelength (secondary light); a microlens sheet 21 that imparts a isotropic light condensing action to light; a prism sheet 22 that imparts an anisotropic light condensing action to light; and a reflection type polarizing sheet 23 that polarizes and reflects light. As illustrated in FIGS. 4 and 5, the wavelength conversion sheet 20 is directly placed on the front side of the light guide plate 19, whereas the microlens sheet 21, the prism sheet 22, and the reflection type polarizing sheet 23 are laminated with each other and their outer edges are placed on the front side of the frame 16. That is, the microlens sheet 21, the prism sheet 22, and the reflection type polarizing sheet 23 are disposed on the front side, i.e., the light exit side, so as to oppose the wavelength conversion sheet 20 with an interval corresponding to the frame 16 (a frame portion 16a to be described in detail later). The concrete configuration of the wavelength conversion sheet 20 will be described in detail later.

The microlens sheet 21 has a base member and a microlens portion provided on the front side plate surface of the base member. The microlens portion has a large number of unit microlenses arranged in a planar matrix configuration (matrix form) along the X-axis direction and the Y-axis direction. The unit microlenses are convex lenses having a substantially circular shape when viewed in plan and a generally substantially hemispherical shape. With this configuration, the microlens sheet 21 imparts an isotropic light condensing action (anisotropic light condensing action) to the light with respect to the X-axis direction and the Y-axis direction. The prism sheet 22 has a base member and a prism portion provided on the front sideplate surface of the base member. The prism portion is composed of a number of unit prisms extending along the X-axis direction and arranged along the Y-axis direction. The unit prisms have the shape of parallel rails (lines) in the X-axis direction as viewed in plan, and has a cross sectional shape along the Y-axis direction that is substantially an isosceles triangle shape. With this configuration, the prism sheet 22 selectively imparts a light condensing action (anisotropic light condensing action to the light with respect to the Y-axis direction (the direction in which the unit prisms are arranged, the direction orthogonal to the extending direction of the unit prisms). The reflection type polarizing sheet 23 is composed of a reflective polarizing film that polarizes and reflects light and a pair of diffusing films that sandwich the reflective polarizing film from the front and back. The reflective polarizing film has a multilayer structure in which, for example, layers having different refractive indexes are alternately laminated, and is configured to transmit p waves contained in light and reflect s waves to the back side. The s waves reflected by the reflective polarizing film are reflected again to the front side by a second reflection sheet 25 and the like which will be described later, where the s waves are separated into an s wave and a p wave. As described above, the reflection type polarizing sheet 23, being provided with the reflective polarizing film, can reflect the s-wave that would be absorbed by the polarizing plate of the liquid crystal panel 11 to the back side (the side of the second reflection sheet 25) for reutilization, whereby the light utilization efficiency (and eventually brightness) can be increased. The pair of diffusion films is made of a synthetic resin material such as polycarbonate, and embossed on the plate surface on the side opposite to the reflective polarizing film side, thereby imparting a diffusing action to the light.

As illustrated in FIG. 2, the frame 16 has the laterally elongated frame-shaped portion (picture frame-like portion) 16a extending along the outer peripheral edge portions of the light guide plate 19 and the optical members 15, and is configured to press, by means of the frame-shaped portion 16a, the outer peripheral edge portions of the light guide plate 19 substantially throughout the periphery thereof from the front side via the wavelength conversion sheet 20, which will be described later. To a surface on the back side of one of the long-side portions of the frame-shaped portion 16a which opposes the light guide plate 19 and the LED substrate 18 (LEDs 17), as illustrated in FIG. 4, a first reflection sheet (frame-side reflection sheet) 24 for reflecting light is attached. The first reflection sheet 24 has a white surface for excellent optical reflection, and is sized so as to extend along substantially the entire length of the one long-side portion of the frame-shaped portion 16a. The first reflection sheet 24 is directly brought into contact with the end portion of the light guide plate 19 on a side of the LEDs 17, and covers the end portion of the light guide plate 19 and the LED substrate 18 collectively from the front side. The frame-shaped portion 16a of the frame 16 is interposed between the microlens sheet 21 of the optical members 15 and the wavelength conversion sheet 20, and supports the outer peripheral edge portions of the microlens sheet 21 from the back side. In this way, the microlens sheet 21 is kept in a position such that an interval corresponding to the frame-shaped portion 16a is provided between the microlens sheet 21 and the wavelength conversion sheet 20. In addition, the frame 16 includes a liquid crystal panel support portion 16b which protrudes from the frame-shaped portion 16a toward the front side, and which supports the outer peripheral edge portions of the liquid crystal panel 11 from the back side.

The LEDs 17 and the LED substrate 18 on which the LEDs 17 are mounted will be described. The LEDs 17, as illustrated in FIG. 3 and FIG. 4, are surface-mounted on the LED substrate 18. The LEDs 17 are of the so-called top-emitting type, and have light emitting surfaces 17a facing on the opposite side from the side of the LED substrate 18. Specifically, the LEDs 17 include blue LED elements (blue light-emitting elements, blue LED chips) as light-emitting sources each encapsulated in a case using an encapsulant. That is, the LEDs 17 are blue LEDs that emit single-color light of blue. Some of the blue light emitted from the LEDs 17 is wavelength-converted into green light or red light by the wavelength conversion sheet 20 as will be described later. The wavelength-converted green light and red light (secondary light) are additively mixed with the blue light (primary light) from the LEDs 17, whereby approximately white output light is obtained from the backlight unit 12. The blue LED elements of the LEDs 17 are semiconductors, for example, including a semiconductor material such as InGaN. The blue LED elements are configured to emit single-color light of blue of wavelengths included in a blue wavelength region (about 420 nm to about 500 nm) upon application of a voltage in the forward direction. That is, the emitted light of the LEDs 17 is the single-color light of the same color as the emitted light of the blue LED elements. The blue LED elements are connected, via a lead frame which is not illustrated, to a wiring pattern on the LED substrate 18 disposed outside the case.

As illustrated in FIG. 3 and FIG. 4, the LED substrate 18 has a thin and long plate shape extending along the long-side direction of the chassis 14 (X-axis direction; the longitudinal direction of the light entry end surface 19b of the light guide plate 19). The LED substrate 18 is housed in the chassis 14 with the plate surface thereof in parallel with the X-axis direction and the Z-axis direction, namely, with the plate surface orthogonal to the plate surface of the liquid crystal panel 11 and that of the light guide plate 19 (optical members 15). In other words, the LED substrate 18 has a long-side direction (length direction) of the plate surface aligned with the X-axis direction and a short-side direction (width direction) aligned with the Z-axis direction, and further has a plate thickness direction orthogonal to the plate surface that is aligned with the Y-axis direction. The LED substrate 18 is interposed between the light guide plate 19 and the side portion 14c on the side of one of the long-sides of the chassis 14. The LED substrate 18 is configured to be housed in the chassis 14 from the front side along the Z-axis direction. The LED substrate 18 is disposed such that its plate surface on the opposite side from the mount surface 18a having the LEDs 17 mounted thereon contacts the inner surface of the long-side side portion 14c of the chassis 14. Accordingly, the light emitting surfaces 17a of the LEDs 17 mounted on the LED substrate 18 are opposed to a long-side end surface (light entry end surface 19b) of the light guide plate 19 as will be described later. The optical axes of the LEDs 17, i.e., the direction of travel of the light with the highest emission intensity, are substantially aligned with the Y-axis direction (the direction which is parallel with the plate surface of the liquid crystal panel 11; the direction along which the LEDs 17 and the light guide plate 19 arranged; and the direction normal to the light entry end surface 19b).

As illustrated in FIG. 3 and FIG. 4, the mount surface 18a of the LED substrate 18 on which the LEDs 17 configured as described above are surface-mounted is on the inside of the LED substrate 18, i.e., on the plate surface facing the light guide plate 19 (the surface opposing the light guide plate 19). On the mount surface 18a of the LED substrate 18, a plurality of LEDs 17 are arranged side by side in a row at predetermined intervals (linearly) along the length direction (the X-axis direction). In other words, a plurality of LEDs 17 are arranged side by side intermittently along the long-side direction on one long-side end of the backlight unit 12. Accordingly, the arranged direction of the LEDs 17 is aligned with the length direction of the LED substrate 18 (the X-axis direction). The intervals of the LEDs 17 that are adjacent with respect to the X-axis direction, i.e., the arrangement intervals (arrangement pitch) of the LEDs 17 are substantially equal. In other words, the LEDs 17 are arranged at regular pitches. The mount surface 18a of the LED substrate 18 has a wiring pattern (not illustrated) formed of a metal film (such as copper foil) extending along the X-axis direction and across the LEDs 17 and connecting the adjacent LEDs 17 in series. To a terminal portion formed at the end of the wiring pattern, an LED drive circuit substrate, not illustrated, is electrically connected via a wiring member and the like, not illustrated, so as to supply drive electric power to the LEDs 17. The LED substrate 18 is of a one-side mount type with the mount surface 18a disposed only on one side of the plate surface. The LED substrate 18 includes a base member of metal, such as aluminum, on a surface of which the wiring pattern (not illustrated) is formed via an insulating layer. The material of the base member of the LED substrate 18 maybe an insulating material, such as synthetic resin or ceramic.

The light guide plate 19 includes a synthetic resin material (for example, acrylic resin material such as PMMA) that has a refractive index sufficiently higher than air, and that is substantially transparent (with excellent transparency). As illustrated in FIG. 2 and FIG. 3, the light guide plate 19 has a laterally elongated rectangular shape as viewed in plan, similar to the liquid crystal panel 11 and the chassis 14, and a plate shape with a greater thickness than the optical members 15. In the plate surface of the light guide plate 19, the long-side direction is aligned with the X-axis direction, and the short-side direction is aligned with the Y-axis direction. The plate thickness direction orthogonal to the plate surface is aligned with the Z-axis direction. As illustrated in FIG. 4 and FIG. 5, the light guide plate 19 is disposed directly under the liquid crystal panel 11 and the optical members 15 in the chassis 14. Of the outer peripheral end surfaces of the light guide plate 19, one long-side end surface (the fore side of FIG. 2 and FIG. 3; the left side of FIG. 4) is opposed to the respective LEDs 17 on the LED substrate 18 disposed on one long-side end of the chassis 14. Accordingly, while the arranged direction of the LEDs 17 (LED substrate 18) and the light guide plate 19 is aligned with the Y-axis direction, the arranged direction of the optical members 15 (the liquid crystal panel 11) and the light guide plate 19 is aligned with the Z-axis direction, the arranged directions being orthogonal to each other. The light guide plate 19 has the function of inwardly guiding the light emitted from the LEDs 17 in the Y-axis direction, and causing the light to rise and to be emitted toward the optical members 15 (the front side) while causing the light to propagate therein.

As illustrated in FIG. 4 and FIG. 5, of the pair of plate surfaces of the light guide plate 19, the plate surface on the front side constitutes a light output plate surface (light exit surface) 19a for causing the internal light to be emitted toward the optical members 15 and the liquid crystal panel 11. The light guide plate 19 has the outer peripheral end surfaces that are adjacent with respect to the plate surfaces thereof. The outer peripheral end surfaces include the pair of long-side end surfaces extending longitudinally along the X-axis direction (the arranged direction of the LEDs 17; the long-side direction of the LED substrate 18). Of the pair of long-side end surfaces, one (on the fore side of FIG. 2 and FIG. 3) is the light entry end surface (light incidence plane) 19b which is opposed to the LEDs 17 (LED substrate 18) via a predetermined space, and into which the light emitted from the LEDs 17 directly enters. The light entry end surface 19b, being opposed to the LEDs 17, may be referred to as "an LED-opposing end surface (light source-opposing end surface)". The light entry end surface 19b is a plane which is parallel with the X-axis direction and the Z-axis direction, and which is substantially orthogonal to the light output plate surface 19a. On the other hand, of the outer peripheral end surfaces of the light guide plate 19, the surfaces other than the light entry end surface 19b (the other long-side end surface, and the pair of short-side end surfaces) constitute no-light entry end surfaces 19d on which the light emitted from the LEDs 17 does not directly enter. The no-light entry end surfaces 19d, being not opposed to the LEDs 17, maybe referred to as "LED non-opposing end surfaces (light source non-opposing end surfaces)". The no-light entry end surfaces 19d includes: a no-light entry opposite end surface 19d1 which is the other of the pair of long-side end surfaces among the outer peripheral end surfaces of the light guide plate 19, i.e., the end surface on the opposite side from the light entry end surface 19b; and a pair of no-light entry side end surfaces 19d2) which are the pair of short-side end surfaces adjacent to the light entry end surface 19b and the no-light entry opposite end surface 19d 1. While in the present embodiment, the LED non-opposing end surfaces are described as being the "no-light entry end surfaces 19d", this does not mean that no light at all enters these surfaces. For example, light that has once leaked out of the no-light entry end surfaces 19d may be reflected and returned by the side portions 14c of the chassis 14, the returned light may enter the no-light entry end surfaces 19d.

On the back side of the light guide plate 19, i.e., the opposite plate surface 19c on the opposite side from the light output plate surface 19a, a second reflection sheet (reflection member; a light guide plate-side reflection sheet) 25 is disposed so as to overlap the back side. The second reflection sheet 25 has a white surface for excellent optical reflection. The second reflection sheet 25 is configured to reflect the light that has propagated in the light guide plate 19 and reached the opposite plate surface 19c so as to cause the light to rise toward the front side, i.e., toward the light output plate surface 19a. The second reflection sheet 25 is disposed so as to cover substantially the entire area of the opposite plate surface 19c of the light guide plate 19. The second reflection sheet 25 extends as far as to be overlapping the LED substrate 18 (LEDs 17) as viewed in plan, and is disposed so as to sandwich the LED substrate 18 (LEDs 17) with the first reflection sheet 24 on the front side. In this way, the light from the LEDs 17 is repeatedly reflected between the reflection sheets 24, 25, thereby causing the light to efficiently enter the light entry end surface 19b. The opposite plate surface 19c of the light guide plate 19 is formed with a light reflection pattern (not illustrated). The opposite plate surface 19c includes a light reflection portion for reflecting the light in the light guide plate 19 toward the light output plate surface 19a, thereby promoting optical emission from the light output plate surface 19a. The light reflection portion of the light reflection pattern includes a number of light reflecting dots, of which the distribution density is varied in accordance with the distance from the light entry end surface 19b (LEDs 17). Specifically, the distribution density of the light reflecting dots of the light reflection portion is increased as the distance from the light entry end surface 19b with respect to the Y-axis direction increases (i.e., as the light reflecting dots become closer to the no-light entry opposite end surface 19d1); conversely, the distribution density is decreased as the distance to the light entry end surface 19b decreases (i.e., as the light reflecting dots become farther from the no-light entry opposite end surface 19d 1). In this way, the output light from the light output plate surface 19a is controlled to have a uniform in-plane distribution.

Figure 6:
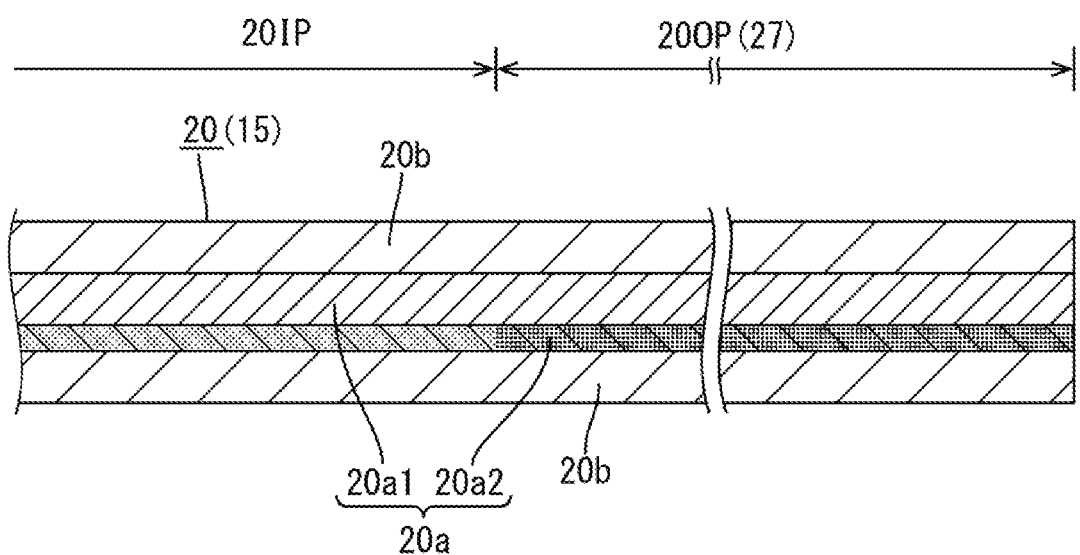
FIG. 6 is a cross sectional view of a wavelength conversion sheet.

The wavelength conversion sheet 20 will now be described in detail. As illustrated in FIG. 4 and FIG. 5, the wavelength conversion sheet 20 is disposed so as to directly overlap the front side of the light output plate surface 19a of the light guide plate 19. The outer peripheral edge portions of the wavelength conversion sheet 20 are pressed by the frame-shaped portion 16a of the frame 16 from the front side throughout the periphery. Of the frame-shaped portion 16a of the frame 16, on the back side surfaces (on the wavelength conversion sheet 20 side) of the three side portions except for one long-side portion on which the first reflection sheet 24 is disposed, a buffer material 26 made of PORON (registered trademark), for example, is provided. Thereby, the pressing force of the frame 16 acting on the wavelength conversion sheet 20 can be released. As illustrated in FIG. 6, the wavelength conversion sheet 20 includes: a wavelength conversion layer (phosphor film) 20a containing a phosphor (wavelength conversion substance) for wavelength conversion of the light from the LEDs 17; and a pair of protection layers (protection films) 20b sandwiching the wavelength conversion layer 20a from the top and bottom to protect the same. The wavelength conversion layer 20a has red phosphor and green phosphor dispersed and compounded therein. The red phosphor emits red light (visible light rays of a specific wavelength region belonging to red) and the green phosphor emits green light (visible light rays of a specific wavelength region belonging to green), using the monochromatic color light of blue from the LEDs 17 as excitation light. The wavelength conversion layer 20a includes a film-shaped base member (phosphor carrier) 20a1 made from substantially transparent synthetic resin, and a phosphor layer 20a2 coating the base member 20a1 and having the red phosphor and green phosphor dispersed and compounded therein. The protection layers 20b are made from substantially transparent synthetic resin and are film-shaped, and have excellent moisture resistance and the like.

More specifically, the phosphors of the respective colors contained in the wavelength conversion layer 20a exhibit emission spectra as follows when excited by blue light. The green phosphor, using blue light as excitation light, emits light of a wavelength region corresponding to green (about 500 nm to about 570 nm), i.e., green light, as fluorescent light. The green phosphor preferably has an emission spectrum with a peak wavelength of about 530 nm in a green light wavelength range, and with a half value width of less than 40 nm. The red phosphor emits, using blue light as excitation light, light of a wavelength region corresponding to red (about 600 nm to about 780 nm), i.e., red light, as fluorescent light. The red phosphor preferably has an emission spectrum with a peak wavelength of about 610 nm in a red light wavelength range and a half value width of less than 40 nm.

Thus, the phosphors for the respective colors are of down-conversion type (downshifting type) in which the excitation wavelength is shorter than the fluorescence wavelength. The down-conversion type phosphors convert excitation light of relatively short wavelength with high energy into fluorescent light of relatively long wavelength with low energy. Accordingly, compared with the case of an up-conversion type of phosphor with an excitation wavelength longer than the fluorescence wavelength (where the quantum efficiency is on the order of 28%, for example), the quantum efficiency (light conversion efficiency) is higher on the order of 30% to 50%. The phosphors of the respective colors are quantum dot phosphors. Quantum dot phosphors have discrete energy levels due to the confinement of electrons, holes, and excitons in a nano-size (for example, on the order of 2 nm to 10 nm in diameter) semiconductor crystal in all orientations of the three-dimensional space. By varying the size of the dots, the peak wavelength (emitted color) of the emitted light can be selected as appropriate, for example. The emitted light (fluorescent light) of the quantum dot phosphor has a sharp peak in the emission spectrum and a resultant narrow half value width thereof, and therefore exhibits extremely high chromatic purity and a wide color gamut. Examples of the material of the quantum dot phosphor include: material combining Zn, Cd, Hg, Pb, or the like that becomes a divalent cation, and O, S, Se, Te, or the like that become a divalent anion (such as CdSe (cadmium selenide) and ZnS (zinc sulfide)); material combining Ga, In, or the like that becomes a trivalent cation and P, As, Sb or the like that becomes a trivalent anion (such as InP (indium phosphide) and GaAs (gallium arsenide)) ; and a chalcopyrite type compound (such as $CuInSe_2$) . In the present embodiment, as the quantum dot phosphor material, CdSe and ZnS from the above are used in combination. In the present embodiment, the quantum dot phosphors are so-called core-shell type quantum dot phosphor. A core-shell type quantum dot phosphor has a structure in which a quantum dot is covered with a shell including a semiconductor substance with a relatively large band gap. Specifically, as the core-shell type quantum dot phosphor, the "Lumidot (registered trademark) CdSe/ZnS" product available from Sigma-Aldrich Japan is preferably used.

As illustrated in FIG. 4 and FIG. 5, in the edge light backlight unit 12 as in the present embodiment, the light propagating in the light guide plate 19 is not necessarily entirely emitted from the light output plate surface 19a, and some of the light may also be emitted from the no-light entry end surfaces 19d. In particular, the light that is emitted from the LEDs 17, enters the light entry end surface 19b of the light guide plate 19, propagates in the light guide plate 19, and is then emitted as is from the no-light entry end surfaces 19d exhibits the color of blue. The light propagating in the light guide plate 19 includes the retroreflected light that, after having been emitted from the light output plate surface 19a and reflected by the optical members 15 and the like, returns into the light guide plate 19. The retroreflected light tends to have a smaller number of times of reflections, i.e., a smaller number of times of passage through the wavelength conversion sheet 20, on the outer peripheral sides of the light guide plate 19 than in the center. Accordingly, the retroreflected light that is emitted from the outer peripheral sides of the light guide plate 19 (including the no-light entry end surfaces 19d) has a color tint which is closer to the color tint of the light of the LEDs 17, i.e., blue, than that of the retroreflected light emitted from the center of the light guide plate 19. Conventionally, it has been difficult to wavelength-convert the light emitted from the no-light entry end surfaces 19d using the wavelength conversion sheet. Accordingly, once the light leaks externally via a gap between the buffer material 26 and the light guide plate 19, for example, the output light of the backlight unit 12 is likely to have a blue tint only on the outer peripheral sides. As a result, the output light of the backlight unit 12 has tended to have a color tint difference between the outer peripheral sides and the center.

Figure 7:
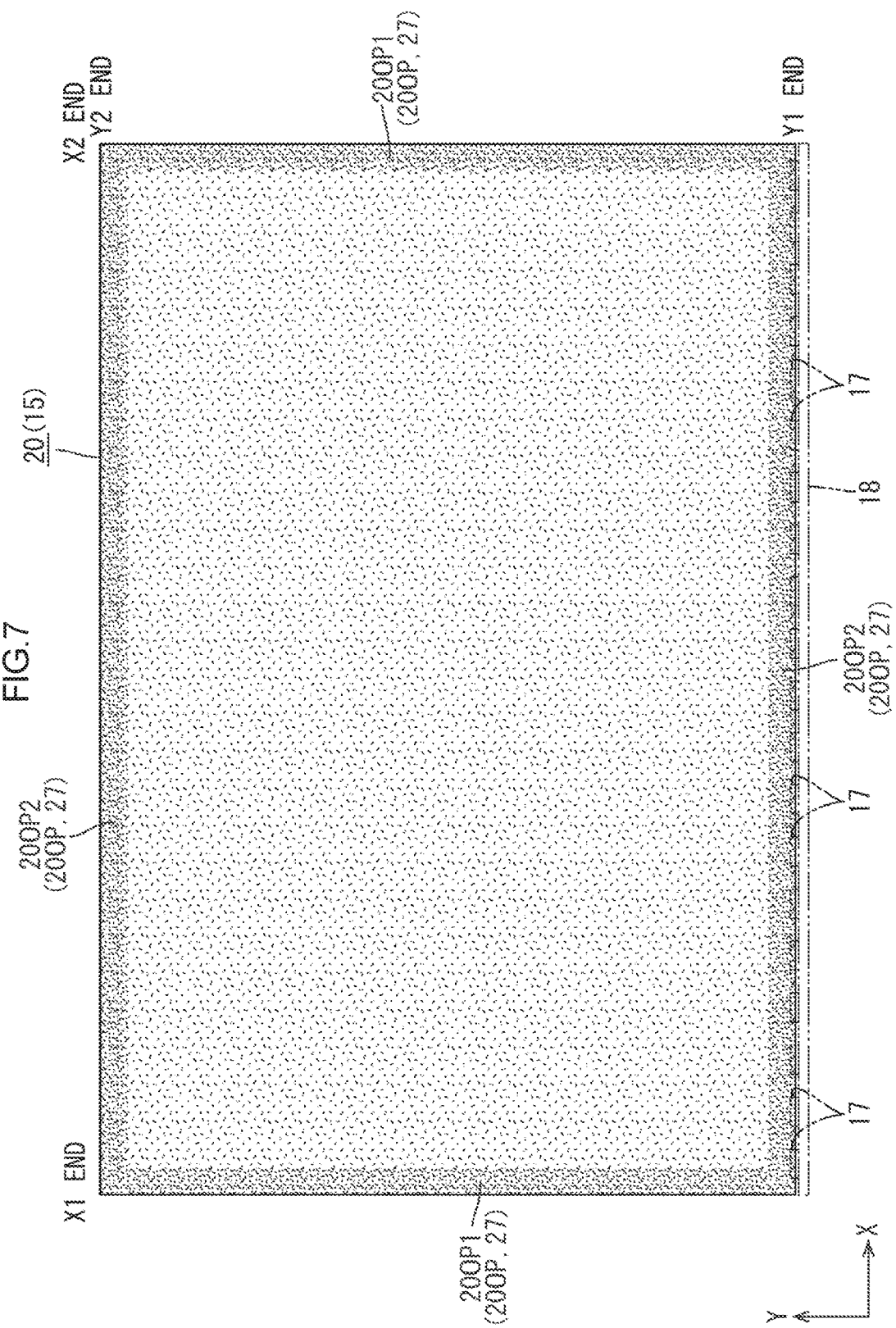
FIG. 7 is a plan view of the wavelength conversion sheet.
Figure 8:
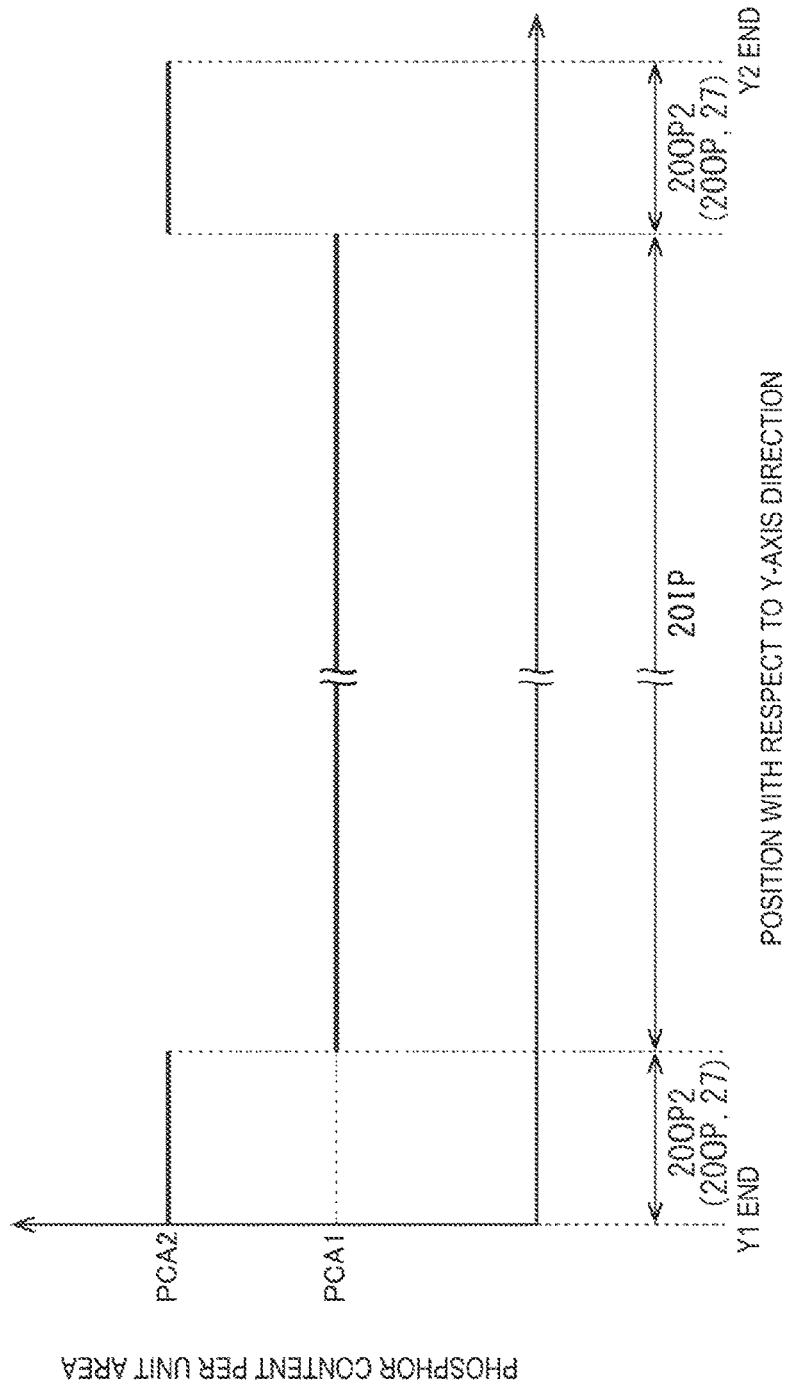
FIG. 8 is a graph illustrating changes in the phosphor content per unit area from Y1 end to Y2 end of the wavelength conversion sheet.
Figure 9:
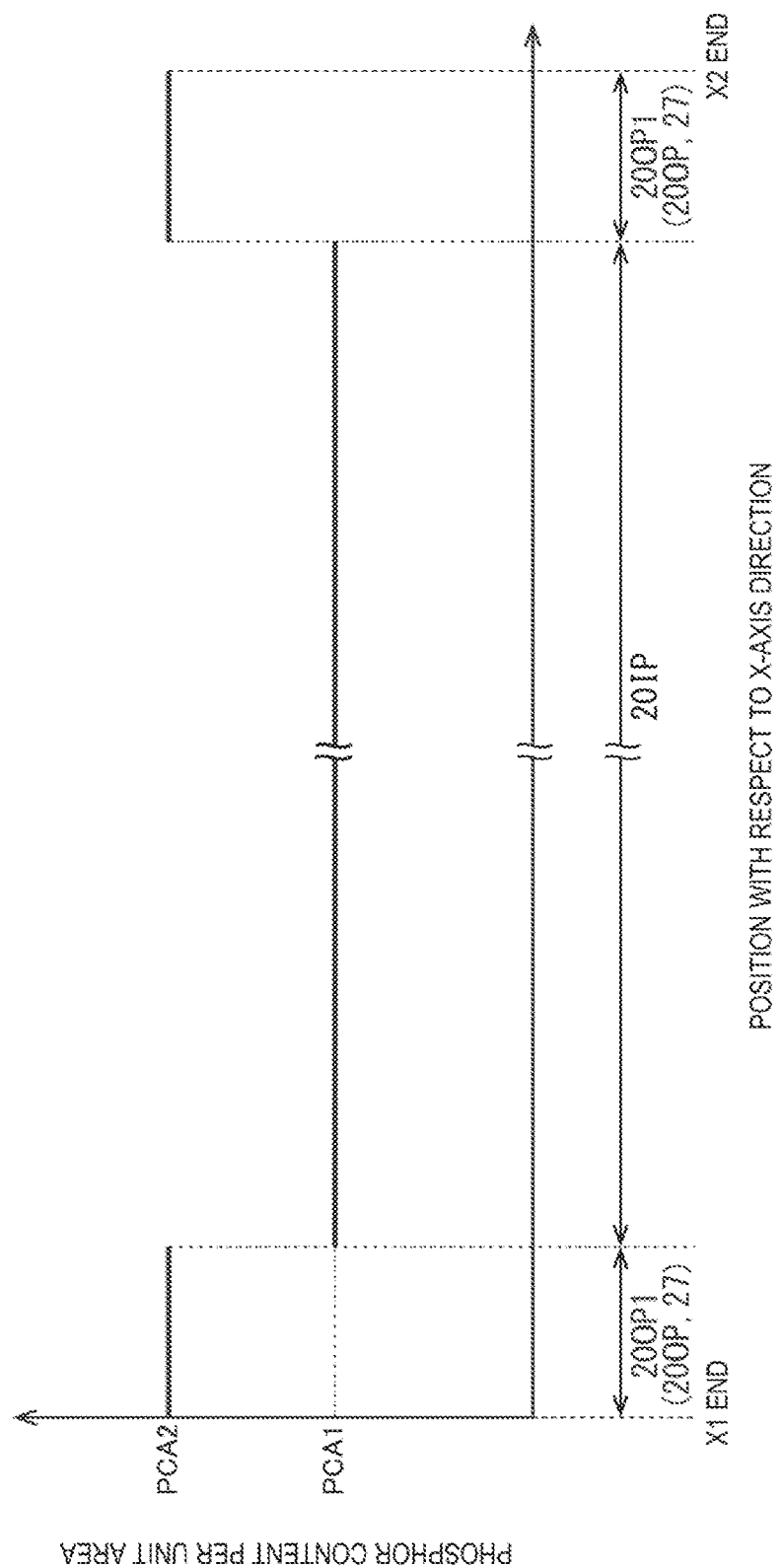
FIG. 9 is a graph illustrating changes in the phosphor content per unit area from X1 end to X2 end of the wavelength conversion sheet.

Accordingly, the wavelength conversion sheet 20 of the backlight unit 12 according to the present embodiment has a configuration illustrated in FIG. 7 to FIG. 9. Specifically, the wavelength conversion sheet 20 is partitioned into a central portion 20IP and outer peripheral side portions 20OP with a frame shape surrounding the central portion 20IP. The outer peripheral side portions 20OP include an increased phosphor portion 27 in which a phosphor content per unit area PCA2 is greater than a phosphor content per unit area PCA1 of the central portion 20IP. The outer peripheral side portions 20OP include a pair of short-side portions 20OP1 and a pair of long-side portions 20OP2, and has as a whole a substantially constant-width, laterally elongated frame shape (endless ring-shape). In this configuration, the light emitted from the outer peripheral sides of the light guide plate 19 (including the outer peripheral end surfaces) can be wavelength-converted with higher efficiency by the increased phosphor portion 27 of the outer peripheral side portions 20OP of the wavelength conversion sheet 20. That is, the blue light that has been emitted from the LEDs 17, entered the light entry end surface 19b of the light guide plate 19, propagated in the light guide plate 19, and then emitted as is from the no-light entry end surfaces 19d, and the retroreflected light having a blue tint (with a higher content ratio corresponding to blue light) due to the smaller number of times of reflections, are wavelength-converted, when they pass through the increased phosphor portion 27, into green light and red light by the green phosphor and the red phosphor that have the relatively greater per unit area content PCA2 than in the central portion 20IP. In this way, even if the light emitted from the no-light entry end surfaces 19d is externally leaked via a gap between the buffer material 26 and the light guide plate 19, for example, the color tint difference in output light between the center and the outer peripheral sides of the backlight unit 12 is made difficult to occur, whereby the occurrence of color irregularity is suppressed. FIG. 8 is a graph illustrating the distribution of the phosphor content per unit area of the wavelength conversion sheet 20 along the Y-axis direction, from Y1 end to Y2 end of the wavelength conversion sheet 20. FIG. 9 similarly is a graph illustrating the distribution of the phosphor content per unit area of the wavelength conversion sheet 20 along the X-axis direction, from X1 end to X2 end of the wavelength conversion sheet 20. In FIG. 2, FIG. 4, FIG. 5, and FIG. 7, the phosphor content per unit area of the wavelength conversion sheet 20 is indicated by the density of dots. That is, in FIG. 2, FIG. 4, FIG. 5, and FIG. 7, the greater the dot density, the greater the phosphor content per unit area; conversely, the smaller the dot density, the smaller the phosphor content per unit area.

The wavelength conversion sheet 20, as illustrated in FIG. 2 to FIG. 5 and FIG. 7, has an outer shape size (long-side size and short-side size) greater than an outer shape size of the light guide plate 19. Specifically, the outer peripheral side portions 20OP of the wavelength conversion sheet 20 includes a protruding portion 28 which protrudes outside the outer peripheral end surfaces of the light guide plate 19 (the light entry end surface 19b and the no-light entry end surfaces 19d) . The central portion 20IP of the wavelength conversion sheet 20 has a laterally elongated rectangular shape slightly smaller than the outer shape of the light guide plate 19. The outer peripheral side portions 20OP surrounding the central portion 20IP includes the protruding portion 28 and a portion immediately on the inside thereof. The outer peripheral side portions 20OP has an inner peripheral end position (boundary position with respect to the central portion 20IP) which is on the inside of the outer peripheral end surfaces of the light guide plate 19, and an outer peripheral end position which is outside the outer peripheral end surfaces of the light guide plate 19. The increased phosphor portion 27 is provided in the entire area of the outer peripheral side portions 20OP. That is, the increased phosphor portion 27 is provided across the protruding portion 28 of the wavelength conversion sheet 20 and the portion immediately on the inside thereof. In this configuration, in addition to the light emitted from the outer peripheral end surfaces of the light guide plate 19, the light emitted from the outer end portions of the light output plate surface 19a of the light guide plate 19 can also be efficiently wavelength-converted by the increased phosphor portion 27 spanning between the protruding portion 28 and the portion on the inside thereof of the wavelength conversion sheet 20. As a result, color irregularity can be preferably suppressed. In FIG. 3, the outer shape of the wavelength conversion sheet 20 is indicated by a dashed-and-double-dotted line.

In other words, the increased phosphor portion 27, as illustrated in FIG. 2 to FIG. 5 and FIG. 7, is provided across, of the outer peripheral side portions 20OP of the wavelength conversion sheet 20, the entire areas of the portions along the no-light entry end surfaces 19d of the light guide plate 19 (one long-side portion along the no-light entry opposite end surface 19d 1, and a pair of short-side portions along the pair of no-light entry side end surfaces 19d2)), and the entire area of the portion along the light entry end surface 19b of the light guide plate 19 (one long-side portion along the light entry end surface 19b), and has a laterally elongated frame shape as viewed in plan. In this configuration, in addition to the light that could be emitted in greater amounts from the no-light entry end surfaces 19d of the light guide plate 19, the light emitted from the light entry end surface 19b can also be efficiently wavelength-converted by the increased phosphor portion 27. Accordingly, color irregularity can be suppressed in a more preferable manner.

As illustrated in FIG. 8 and FIG. 9, the phosphor content per unit area PCA1 of the central portion 20IP of the wavelength conversion sheet 20 is substantially constant regardless of the position with respect to the X-axis direction and the Y-axis direction. In the increased phosphor portion 27 of the outer peripheral side portions 20OP, the phosphor content per unit area PCA2 is relatively greater than the content PCA1 of the central portion 20IP, and is substantially constant regardless of the position with respect to the X-axis direction and the Y-axis direction. In addition, as illustrated in FIG. 6 and FIG. 7, the wavelength conversion sheet 20 has a phosphor distribution density in the increased phosphor portion 27 which is greater than the phosphor distribution density in the central portion 20IP. Specifically, in the wavelength conversion layer 20a of the wavelength conversion sheet 20, as illustrated in FIG. 7, while the phosphor layer 20a2 has a substantially constant thickness throughout the entire area thereof, the compounding ratios (concentrations) of the red phosphor and green phosphor dispersed and compounded in the phosphor layer 20a2 are different between the central portion 20IP and the outer peripheral side portions 20OP (increased phosphor portion 27). That is, the latter has a relatively higher compounding ratio than the former. The wavelength conversion sheet 20 with this configuration may be manufactured preferably by the following technique. For example, the phosphor layer 20a2 is formed by coating a surface of the base member 20a1 with a phosphor paint having the red phosphor and green phosphor dispersed and compounded therein. In this case, of the base member 20a1, the central portion 20IP is coated with a low-compound phosphor paint that has relatively low compounding ratios of the red phosphor and green phosphor. The outer peripheral side portions 20OP (increased phosphor portion 27) is coated with a high-compound phosphor paint that has relatively high compounding ratios of the red phosphor and green phosphor.

The operation of the present embodiment with the above-described structure will be described. When the power supply to the liquid crystal display device 10 configured as described above is turned on, the driving of the liquid crystal panel 11 is controlled by a panel control circuit on a control substrate not illustrated. When the drive electric power from an LED drive circuit on a LED drive circuit substrate not illustrated is supplied to the LEDs 17 on the LED substrate 18, the driving of the LEDs 17 is controlled. The light from the LEDs 17 is guided by the light guide plate 19 and directed to the liquid crystal panel 11 via the optical members 15, whereby a predetermined image is displayed on the liquid crystal panel 11. In the following, the operation of the backlight unit 12 will be described in detail.

Referring to FIG. 4, when the LEDs 17 are turned on, the light emitted from the LEDs 17 enters the light entry end surface 19b of the light guide plate 19. While a predetermined space is provided between the LEDs 17 and the light entry end surface 19b, the space is sandwiched between the first reflection sheet 24 on the front side and the extending portion of the second reflection sheet 25 on the back side. Accordingly, the light from the LEDs 17 is repeatedly reflected by the opposing portions of the reflection sheets 24, 25, whereby the light is caused to efficiently enter the light entry end surface 19b. The light that has entered the light entry end surface 19b is scattered and reflected by the light reflection portion of the light reflection pattern and propagates in the light guide plate 19 while being totally reflected at the interface between the light guide plate 19 and the external air layer or reflected by the second reflection sheet 25. Thereby, the angle of incidence of the light with respect to the light output plate surface 19a becomes less than a critical angle, whereby the emission from the light output plate surface 19a is promoted. The light that has been emitted from the light output plate surface 19a of the light guide plate 19 is provided to the liquid crystal panel 11 after being subjected to the respective optical actions of the optical members 15 as the light passes therethrough. Some of the emitted light is retroreflected by the optical members 15 and thereby returned into the light guide plate 19. The returned light thereafter exits the light output plate surface 19a and the like as retroreflected light, and constitutes the output light of the backlight unit 12.

The optical actions of the optical members 15 will be described in detail. Referring to FIG. 4, the blue light that has been emitted from the light output plate surface 19a of the light guide plate 19 is wavelength-converted into green light and red light (secondary light) by the green phosphor and red phosphor contained in the wavelength conversion sheet 20 overlapped directly on the front side of the light output plate surface 19a. The wavelength-converted green light and red light, i.e., yellow light (secondary light) and the blue light of the LEDs 17 (primary light) produce approximately white illumination light. The blue light of the LEDs 17 (primary light) and the wavelength-converted green light and red light (secondary light) are subjected to a light condensing action (isotropic light condensing action) by the microlens sheet 21 isotropically with respect to the X-axis direction and the Y-axis direction, and then subjected to a light condensing action by the prism sheet 22 selectively with respect to the Y-axis direction (anisotropic light condensing action). Thereafter, of the light that has exited the prism sheet 22, specific polarization light (p wave) is selectively transmitted by the reflection type polarizing sheet 23 and emitted toward the liquid crystal panel 11, while different specific polarization light (s wave) is selectively reflected toward the back side. The s wave reflected by the reflection type polarizing sheet 23 and the light that is reflected to the back side without being subjected to the light condensing action by prism sheet 22 and the microlens sheet 21, for example, are returned into the light guide plate 19 and again reflected by the second reflection sheet 25, for example, during the process of propagating in the light guide plate 19, and are again emitted toward the front side via the light output plate surface 19a and the like.

Referring to FIG. 4 and FIG. 5, the blue light (primary light) emitted from the LEDs 17 and propagating in the light guide plate 19 is not necessarily entirely emitted from the light output plate surface 19a. Rather, some of the light may be emitted as is from the no-light entry end surfaces 19d of the outer peripheral end surfaces of the light guide plate 19. The light propagating in the light guide plate 19 includes the retroreflected light that has been emitted from the light output plate surface 19a and then returned into the light guide plate 19. The retroreflected light tends to have a smaller number of times of reflections (the number of times of retroreflection), i.e., a smaller number of times of passage through the wavelength conversion sheet 20, on the outer peripheral side of the light guide plate 19 than in the center thereof. Accordingly, the retroreflected light emitted from the outer peripheral sides of the light guide plate 19 (including the outer peripheral end surfaces) has a blue tint closer to the color tint of the blue light of the LEDs 17, compared with the retroreflected light emitted from the center of the light guide plate 19. In this respect, in the wavelength conversion sheet 20 according to the present embodiment, as illustrated in FIG. 7 to FIG. 9, the outer peripheral side portions 20OP include the increased phosphor portion 27 with the relatively greater phosphor content per unit area PCA2 than in the central portion 20IP. Accordingly, referring to FIG. 4 and FIG. 5, the light emitted from the outer peripheral sides of the light guide plate 19 can be wavelength-converted with higher efficiency by the increased phosphor portion 27 of the outer peripheral side portions 20OP. That is, the blue light (primary light) that has been emitted from the LEDs 17, entered the light entry end surface 19b of the light guide plate 19, propagated in the light guide plate 19, and then emitted as is from the no-light entry end surfaces 19d, and the retroreflected light that has a blue tint (a high content ratio corresponding to blue light) due to the small number of times of reflections and that is emitted from the no-light entry end surfaces 19d or the light output plate surface 19a, when they pass through the increased phosphor portion 27 with the relatively greater per unit area green phosphor and red phosphor content PCA2 than in the central portion 20IP, are wavelength-converted into green light and red light (secondary light) by the green phosphor and red phosphor with high wavelength conversion efficiency. In this way, even if the light emitted from the no-light entry end surfaces 19d is externally leaked via a gap between the buffer material 26 and the light guide plate 19, for example, the color tint difference in output light between the center and the outer peripheral sides of the backlight unit 12 is made difficult to occur, whereby the occurrence of color irregularity is suppressed.

In addition, the increased phosphor portion 27, as illustrated in FIG. 4 and FIG. 5, is provided in the protruding portion 28 of the wavelength conversion sheet 20 protruding outside the outer peripheral end surfaces of the light guide plate 19. In addition, the increased phosphor portion 27 is also provided in the portion immediately on the inside of the protruding portion 28. Accordingly, the light emitted from the outer peripheral end surfaces of the light guide plate 19 can be wavelength-converted with higher wavelength conversion efficiency, whereby the occurrence of color irregularity can be more preferably suppressed. Furthermore, the increased phosphor portion 27 is provided in the entire area of the outer peripheral side portions 20OP of the wavelength conversion sheet 20, including the entire area of the portion along the no-light entry end surfaces 19d of the light guide plate 19 and also the entire area of the portion along the light entry end surface 19b. Accordingly, in addition to the relatively large amount of light emitted from the no-light entry end surfaces 19d of the light guide plate 19, the light emitted from the light entry end surface 19b can also be wavelength-converted with high wavelength conversion efficiency. In this way, the occurrence of color irregularity can be suppressed in an even more preferable manner.

As described above, the backlight unit (lighting device) 12 of the present embodiment includes: the LEDs (light sources) 17; the light guide plate 19 that has, in at least a part of the outer peripheral end surfaces thereof, the light entry end surface 19b that the light from the LEDs 17 enters, and that has the light output plate surface 19a for causing light to be emitted from a plate surface; and the wavelength conversion sheet (wavelength conversion member) 20 that is disposed so as to overlap the light output plate surface 19a of the light guide plate 19, and that contains the phosphor for wavelength-converting the light from the LEDs 17, the wavelength conversion sheet 20 including the increased phosphor portion 27 in which at least a part of the outer peripheral side portions 20OP has a greater phosphor content per unit area PCA2 than in the central portion 20IP.

In this way, the light emitted from the LEDs 17, after entering the light entry end surface 19b among the outer peripheral end surfaces of the light guide plate 19 and propagating in the light guide plate 19, is emitted from the light output plate surface 19a. The light emitted from the light output plate surface 19a of the light guide plate 19 is wavelength-converted by the phosphor contained in the wavelength conversion sheet 20 overlapped on the light output plate surface 19a. In this case, the light propagating in the light guide plate 19 is not necessarily entirely emitted from the light output plate surface 19a, and some of the light may be emitted from the outer peripheral end surfaces of the light guide plate 19. The light propagating in the light guide plate 19 includes the retroreflected light that has been emitted from the light output plate surface 19a and then returned into the light guide plate 19. The retroreflected light tends to have a smaller number of times of reflections on the outer peripheral sides of the light guide plate 19 than in the center thereof. As a result, the retroreflected light emitted from the outer peripheral sides of the light guide plate 19 (including the outer peripheral end surfaces) has a color tint closer to the color tint of the light of the LEDs 17 than the retroreflected light emitted from the center of the light guide plate 19.

In this respect, in the wavelength conversion sheet 20, at least a part of the outer peripheral side portions 20OP includes the increased phosphor portion 27 in which the phosphor content per unit area PCA2 is greater than in the central portion 20IP. Accordingly, at least a part of the light emitted from the outer peripheral sides of the light guide plate 19 (including the outer peripheral end surfaces) can be wavelength-converted with higher efficiency by the increased phosphor portion 27. In this way, the color tint difference in output light between the center and the outer peripheral sides of the backlight unit 12 is made difficult to occur, whereby the occurrence of color irregularity is suppressed.

In the wavelength conversion sheet 20, the outer peripheral side portions 20OP include the protruding portion 28 protruding outside the outer peripheral end surfaces of the light guide plate 19, and at least the protruding portion 28 includes the increased phosphor portion 27. In this way, the light emitted from the outer peripheral end surfaces of the light guide plate 19 can be efficiently wavelength-converted by the increased phosphor portion 27 included in the protruding portion 28 of the wavelength conversion sheet 20, and the color irregularity can be preferably suppressed.

The wavelength conversion sheet 20 includes the increased phosphor portion 27 spanning between the protruding portion 28 and the portion on the inside thereof of the outer peripheral side portions 20OP. In this way, in addition to the light emitted from the outer peripheral end surfaces of the light guide plate 19, the light emitted from the outer end portions of the light output plate surface 19a of the light guide plate 19 can be efficiently wavelength-converted by the increased phosphor portion 27 spanning between the protruding portion 28 and the portion on the inside thereof of the wavelength conversion sheet 20, and the color irregularity can be preferably suppressed.

Of the light guide plate 19, the portions of the outer peripheral end surfaces except for the light entry end surface 19b constitute the no-light entry end surfaces 19d that the light from the LEDs 17 does not directly enter. In the wavelength conversion sheet 20, at least a part of the portion of the outer peripheral side portions 20OP along the no-light entry end surfaces 19d includes the increased phosphor portion 27. The light that propagates in the light guide plate 19 after being emitted from the LEDs 17 and entering the light entry end surface 19b of the light guide plate 19 is emitted in greater amounts via the no-light entry end surfaces 19d in particular, among the outer peripheral end surfaces of the light guide plate 19. In this respect, at least a part of the portion of the outer peripheral side portions 20OP of the wavelength conversion sheet 20 along the no-light entry end surfaces 19d includes the increased phosphor portion 27. Accordingly, the light emitted from the no-light entry end surfaces 19d can be efficiently wavelength-converted by the increased phosphor portion 27, whereby the color irregularity can be preferably suppressed.

In the wavelength conversion sheet 20, the entire area of the portion of the outer peripheral side portions 20OP along the no-light entry end surfaces 19d constitutes the increased phosphor portion 27. In this way, the light emitted from the no-light entry end surfaces 19d of the light guide plate 19 can be even more efficiently wavelength-converted by the increased phosphor portion 27, whereby the color irregularity can be suppressed even more preferably.

In the wavelength conversion sheet 20, the entire area of the outer peripheral side portions 20OP constitutes the increased phosphor portion 27. In this way, the light emitted from the outer peripheral end surfaces of the light guide plate 19 can be even more efficiently wavelength-converted by the increased phosphor portion 27, whereby the color irregularity can be suppressed in a more preferable manner.

In the wavelength conversion sheet 20, the phosphor distribution density in the increased phosphor portion 27 is higher than the phosphor distribution density in the central portion 20IP. In this way, during the manufacture of the wavelength conversion sheet 20, the increased phosphor portion 27 can be provided by, for example, coating phosphors having different distribution densities between at least a part of the outer peripheral side portions 20OP and the central portion 20IP.

The LEDs 17 emits blue light. The wavelength conversion sheet 20 at least contains, as the phosphor, either a green phosphor that wavelength-converts blue light into green light and a red phosphor that wavelength-converts blue light into red light, or a yellow phosphor that wavelength-converts blue light into yellow light. In this way, the blue light emitted from the LEDs 17 is wavelength-converted into green light and red light when the green phosphor and the red phosphor are contained in the wavelength conversion sheet 20, or into yellow light when the yellow phosphor is contained. In this case, even when the light emitted from the outer peripheral sides of the light guide plate 19 has a blue tint, at least a part of the light can be wavelength-converted into green light and red light or yellow light by the increased phosphor portion 27 with higher efficiency, whereby the occurrence of color irregularity is suppressed.

As the phosphor, the wavelength conversion sheet 20 contains the quantum dot phosphor. In this way, the light wavelength conversion efficiency of the wavelength conversion sheet 20 is increased, and the chromatic purity of the wavelength-converted light is increased.

The liquid crystal display device 10 according to the present embodiment includes the above-described backlight unit 12, and the liquid crystal panel (display panel) 11 that displays an image by utilizing the light emitted from the backlight unit 12. With the liquid crystal display device 10 of the configuration, because the occurrence of color irregularity in the output light of the backlight unit 12 is suppressed, a display with excellent display quality can be achieved.

The television device 10TV according to the present embodiment includes the liquid crystal display device 10 as described above. With the television device 10TV, because the liquid crystal display device 10 has excellent display quality, a display of a television image with excellent display quality can be achieved.

<Second Embodiment>

Figure 11:
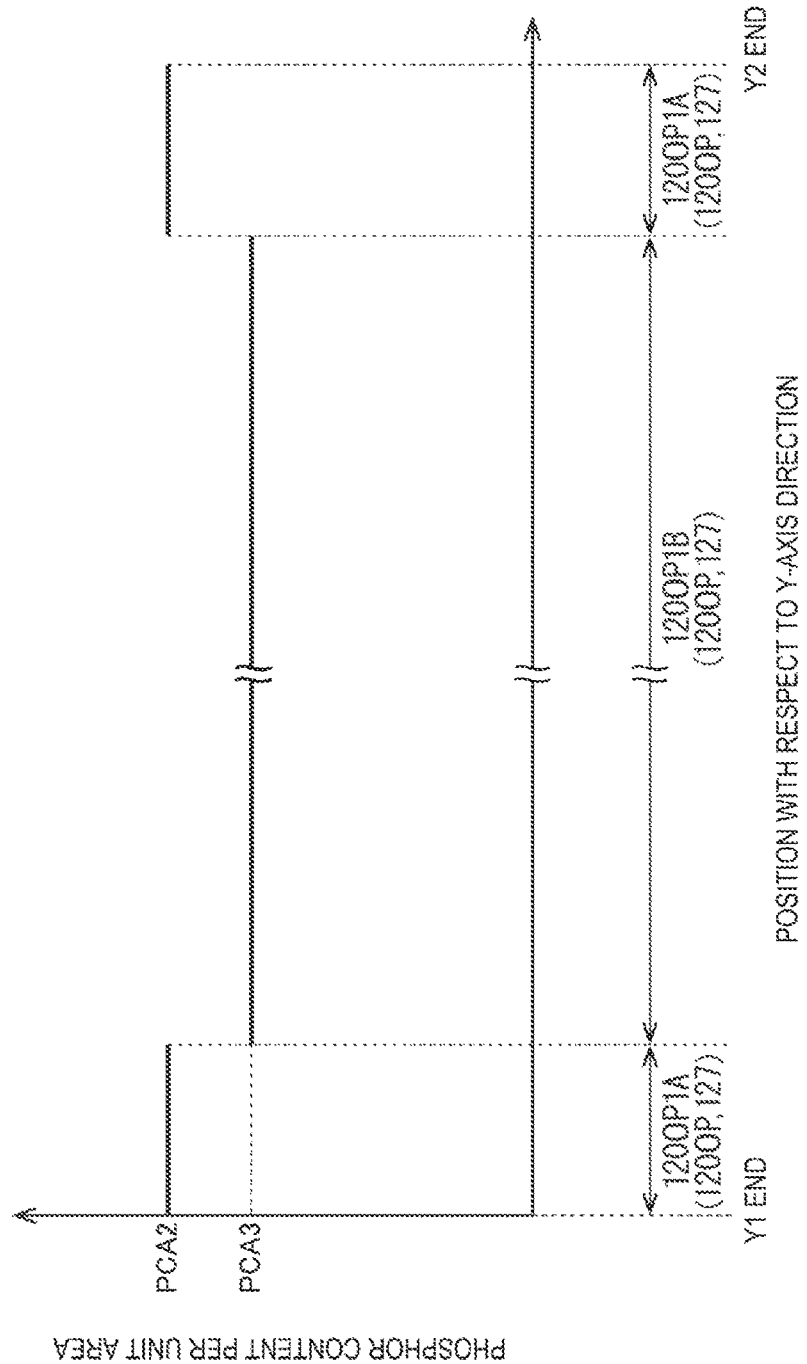
FIG. 11 is a graph illustrating changes in the phosphor content per unit area from Y1 end to Y2 end of a short-side portion of the outer peripheral side portions of the wavelength conversion sheet.
Figure 12:
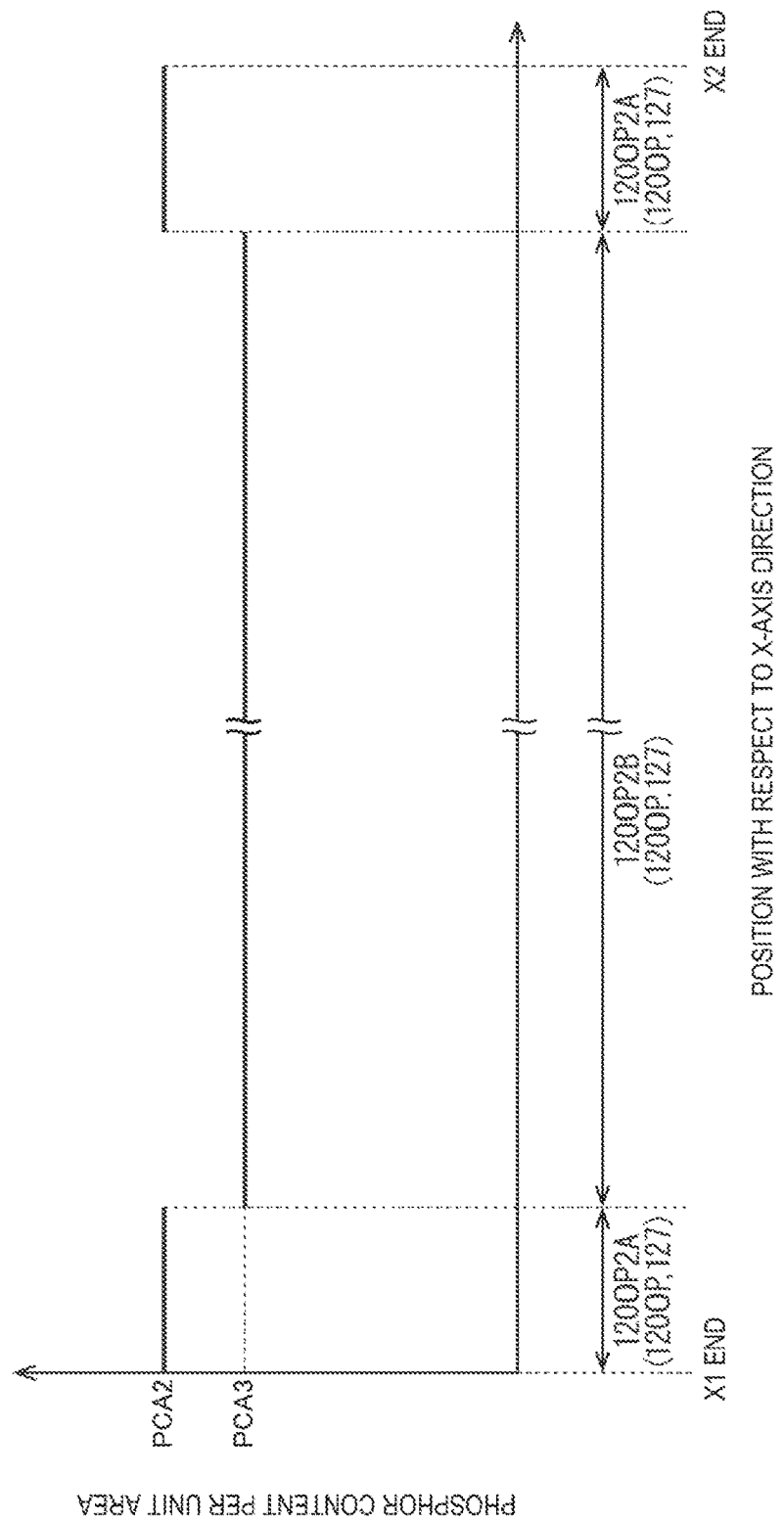
FIG. 12 is a graph illustrating changes in phosphor content per unit area from X1 end to X2 end of a long-side portion of the outer peripheral side portions of the wavelength conversion sheet.

A second embodiment of the present invention will be described with reference to FIG. 10 to FIG. 12. The second embodiment describes a modification in the distribution of the phosphor content per unit area in an increased phosphor portion 127. Redundant descriptions of structures, operations, or effects similar to those of the first embodiment will be omitted.

Figure 10:
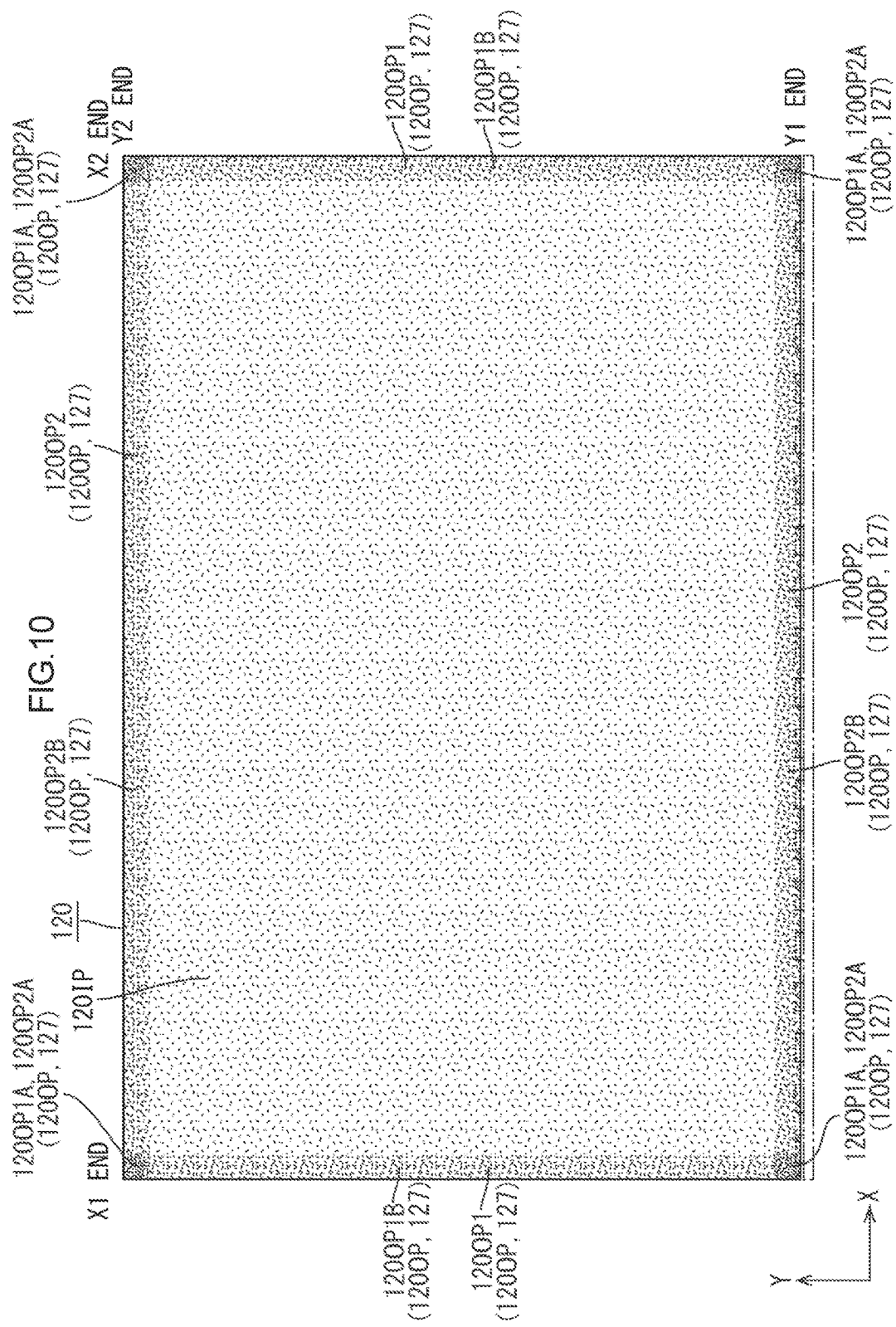
FIG. 10 is a plan view of a wavelength conversion sheet according to a second embodiment of the present invention.

As illustrated in FIG. 10, the increased phosphor portion 127 according to the present embodiment includes outer peripheral side portions 120OP constituting the wavelength conversion sheet 120. In the outer peripheral side portions 120OP, the phosphor content per unit area is varied depending on the position with respect to the direction in which each of side portions 120OP1, 120OP2 extends. Specifically, in the short-side portions 120OP1 of the outer peripheral side portions 120OP of which the entire area is the increased phosphor portion 127, as illustrated in FIG. 10 and FIG. 11, both end portions 120OP1A with respect to the extending direction (the Y-axis direction) have a phosphor content per unit area PCA2 which is relatively greater than a phosphor content per unit area PCA3 in central portions 120OP1B. Similarly, in the long-side portions 120OP2 of the outer peripheral side portions 120OP, as illustrated in FIG. 10 and FIG. 12, both end portions 120OP2A with respect to the extending direction (X-axis direction) have the phosphor content per unit area PCA2 which is relatively greater than the phosphor content per unit area PCA3 in the central portions 120OP2B. That is, the outer peripheral side portions 120OP of the wavelength conversion sheet 120 has the greatest phosphor content per unit area PCA2 in and around the corner portions at the four corners as viewed in plan.

The amount of the light emitted from the outer peripheral end surfaces of the light guide plate tends to be greater in and around the end portions 120OP1A, 120OP2A respectively of the side portions 120OP1, 120OP2 of the outer peripheral side portions 120OP of the wavelength conversion sheet 120, than in and around the central portions 120OP1B, 120OP2B with respect to the extending direction thereof. In this respect, the increased phosphor portion 127 is configured such that the phosphor content per unit area PCA2 is increased in the end portions 120OP1A, 120OP2A respectively of the side portions 120OP1, 120OP2 with respect to the extending direction thereof, than in the central portions 120OP1B, 120OP2B. Accordingly, the light emitted from the outer peripheral end surfaces of the light guide plate around, the end portions 120OP1A, 120OP2A, with respect to the extending direction, of the side portions 120OP1, 120OP2 of the outer peripheral side portions 120OP of the wavelength conversion sheet 120 can be efficiently wavelength-converted by the phosphor, which is included in greater amounts in the increased phosphor portion 127, whereby the color irregularity can be preferably suppressed. In the central portions 120OP1B, 120OP2B with respect to the extending direction of the side portions 120OP1, 120OP2 of the outer peripheral side portions 120OP, the phosphor content per unit area PCA3 is greater than the phosphor content per unit area PCA1 (see FIG. 8 and FIG. 9) in the central portion 120IP but smaller than the phosphor content per unit area PCA2 in the end portions 120OP1A, 120OP2A.

As described above, according to the present embodiment, the wavelength conversion sheet 120 includes the side portions 120OP1, 120OP2 where the outer peripheral side portions 120OP linearly extend. The side portions 120OP1, 120OP2 include the increased phosphor portion 127. In the increased phosphor portion 127, the phosphor content per unit area PCA2 is greater in the end portions 120OP1A, 120OP2A with respect to the extending direction of the side portions 120OP1, 120OP2 than in the central portions 120OP1B, 120OP2B. The amount of the light emitted from the outer peripheral end surfaces of the light guide plate tends to be greater in and around the end portions 120OP1A, 120OP2A with respect to the extending direction of the side portions 120OP1, 120OP2 of the outer peripheral side portions 120OP of the wavelength conversion sheet 120, than in and around the central portions 120OP1B, 120OP2B. In this respect, the increased phosphor portion 127 is configured such that the phosphor content per unit area PCA2 is greater in the end portions 120OP1A, 120OP2A with respect to the extending direction of the side portions 120OP1, 120OP2 than in the central portions 120OP1B, 120OP2B. Accordingly, the light emitted from the outer peripheral end surfaces of the light guide plate around the end portions 120OP1A, 120OP2A with respect to the extending direction of the side portions 120OP1, 120OP2 of the outer peripheral side portions 120OP of the wavelength conversion sheet 120 can be efficiently wavelength-converted by the phosphor included in greater amounts in the increased phosphor portion 127, whereby the color irregularity can be preferably suppressed.

<Third Embodiment>

A third embodiment of the present invention will be described with reference to FIG. 13 or FIG. 14. The third embodiment describes a modification of the first embodiment in the area in which an increased phosphor portion 227 is formed. Redundant descriptions of structures, operations, or effects similar to those of the first embodiment will be omitted.

Figure 13:
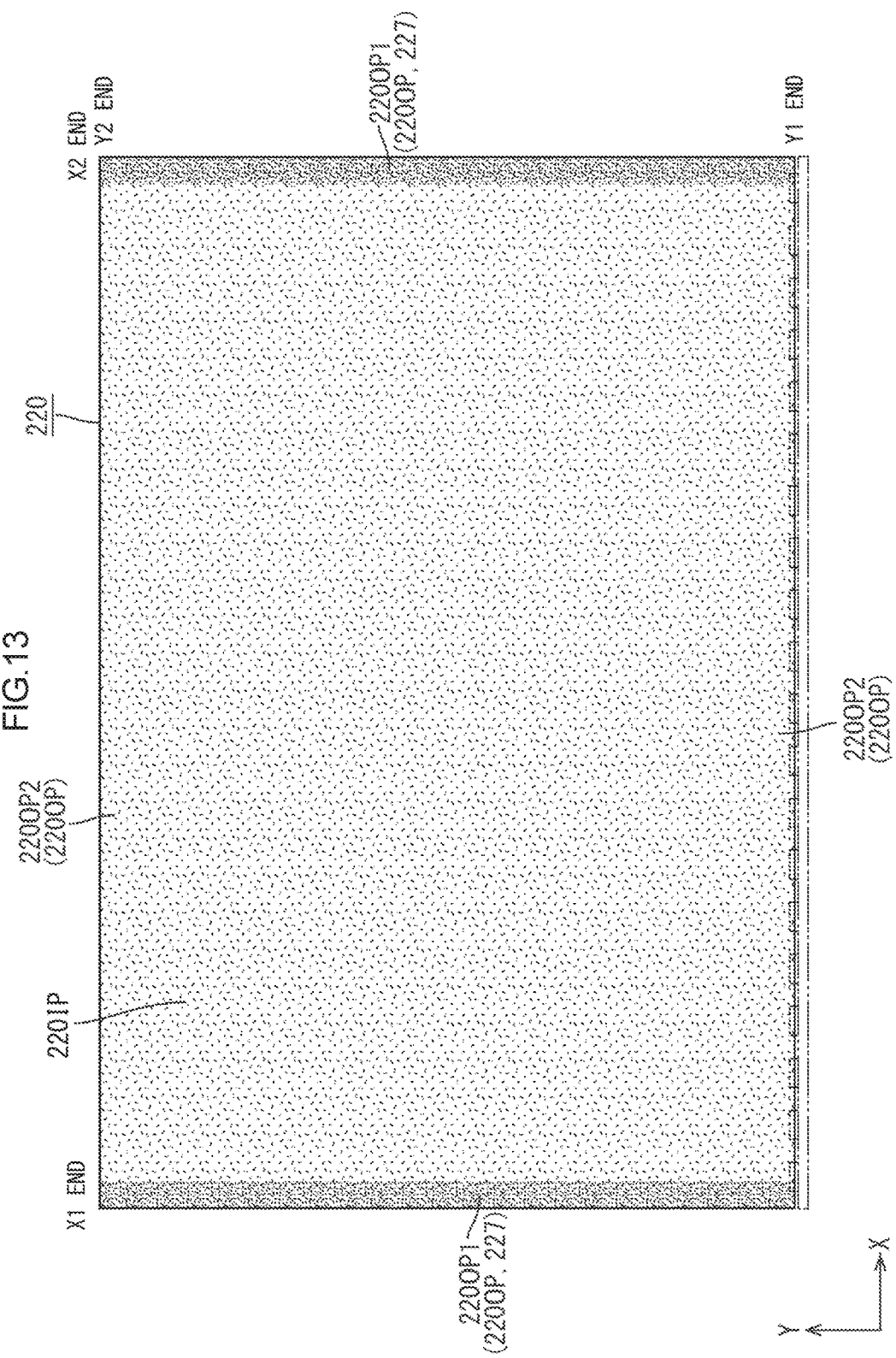
FIG. 13 is a plan view of a wavelength conversion sheet according to a third embodiment of the present invention.
Figure 14:
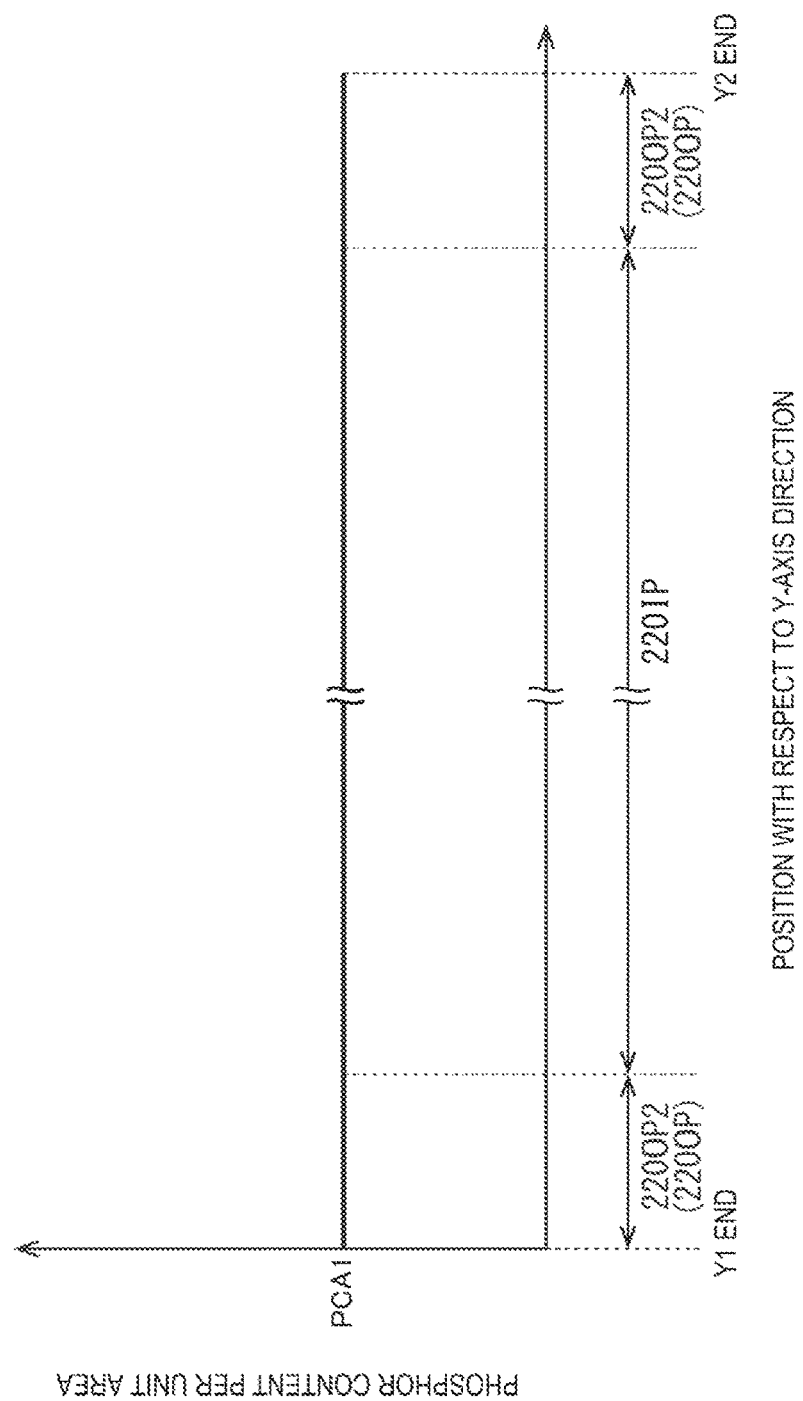
FIG. 14 is a graph illustrating changes in the phosphor content per unit area from Y1 end to Y2 end of the wavelength conversion sheet.

As illustrated in FIG. 13, the increased phosphor portion 227 according to the present embodiment is selectively provided in a pair of parallel short-side portions 220OP1 among outer peripheral side portions 220OP of a wavelength conversion sheet 220. The increased phosphor portion 227 is provided so as to linearly extend along the entire lengths of the pair of short-side portions 220OP1 of the outer peripheral side portions 220OP in the extending direction (the Y-axis direction). The wavelength conversion sheet 220 with this configuration may be preferably manufactured by the following technique. For example, a phosphor layer is formed by unreeling a base material of a base member wound in a roll form and coating the surface of the base material with phosphor paint. In this case, the technique includes: a step of coating the entire surface of the unreeled base material with phosphor paint; a step of aligning the unreeling direction of the base material with the short-side direction of the wavelength conversion sheet 220 and only coating the both side ends thereof, i.e., a pair of short-side portions, with the phosphor paint; and a step of cutting the base material in a direction orthogonal to the unreeling direction, i.e., along the long-side direction of the wavelength conversion sheet 220, thereby obtaining a base member. In this way, the increased phosphor portion 227 can be easily provided selectively in the pair of short-side portions 220OP1 of the wavelength conversion sheet 220, whereby the manufacturing cost of the wavelength conversion sheet 220 can be decreased. On the other hand, in the pair of parallel long-side portion 220OP2 of the outer peripheral side portions 220OP, as illustrated in FIG. 13 and FIG. 14, the increased phosphor portion 227 is not provided, and the phosphor content per unit area PCA1 is the same as in the central portion 220IP. That is, in the wavelength conversion sheet 220, with respect to the entire area except for the pair of short-side portions 220OP1 of the outer peripheral side portions 220OP, the phosphor content per unit area PCA1 is substantially constant.

As described above, according to the present embodiment, in the wavelength conversion sheet 220, the outer peripheral side portions 220OP include the pair of linearly extending and parallel side portions 220OP1, 220OP2. Each of the pair of side portions 220OP1, 220OP2 includes the increased phosphor portion 227. In this way, when the increased phosphor portion 227 is selectively disposed in the outer peripheral side portions 220OP of the wavelength conversion sheet 220, the linearly increased phosphor portion 227 may be provided in each of the pair of side portions 220OP1, 220OP2. Accordingly, the manufacture of the wavelength conversion sheet 220 is facilitated, and the manufacturing cost of the wavelength conversion sheet 220 can be reduced in a preferable manner.

<Fourth Embodiment>

A fourth embodiment of the present invention will be described with reference to FIG. 15 or FIG. 16. The fourth embodiment describes a modification of the first embodiment in the area in which an increased phosphor portion 327 is formed. Redundant descriptions of structures, operations, or effects similar to those of the first embodiment will be omitted.

Figure 15:
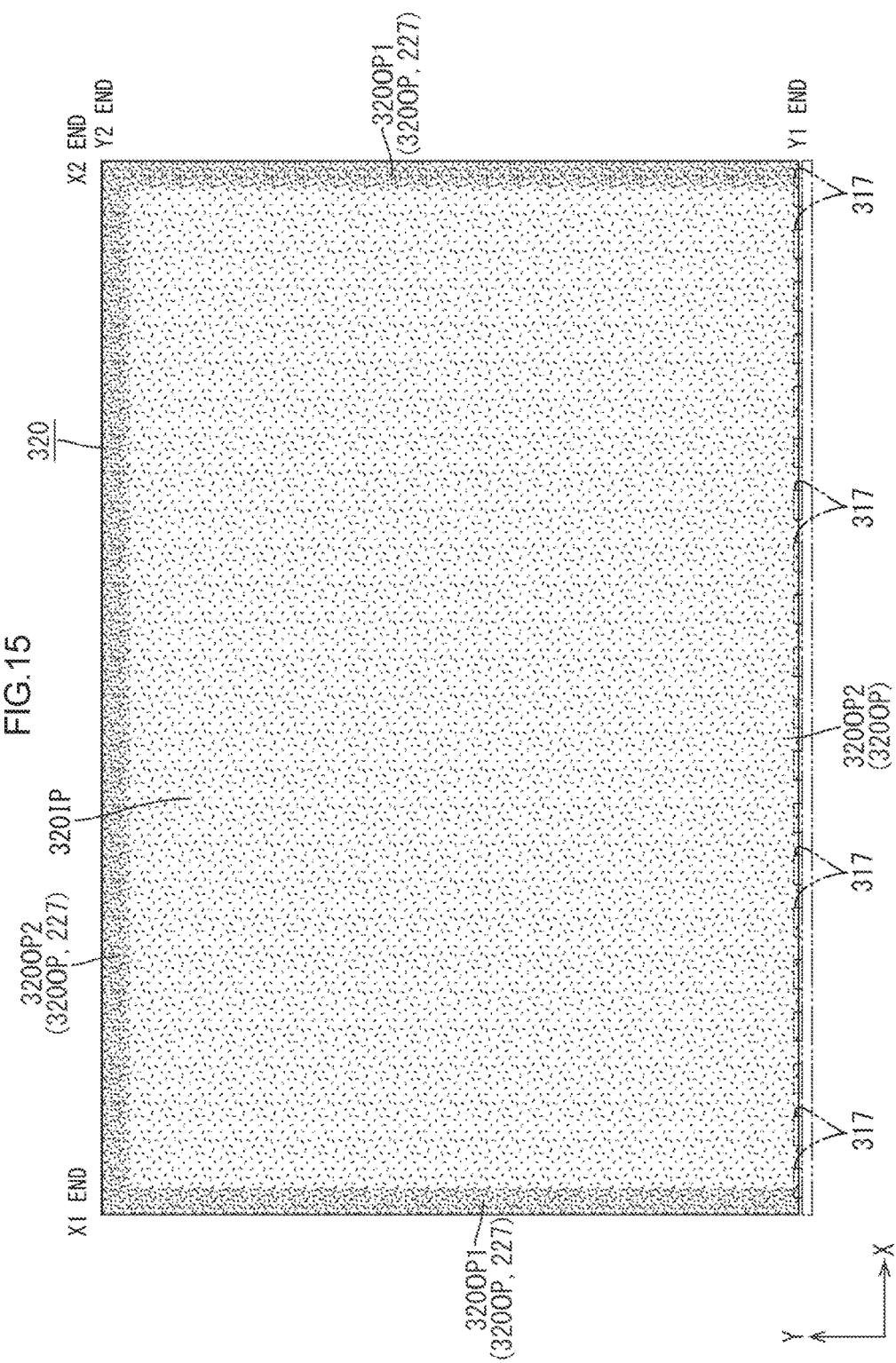
FIG. 15 is a plan view of a wavelength conversion sheet according to a fourth embodiment of the present invention.
Figure 16:
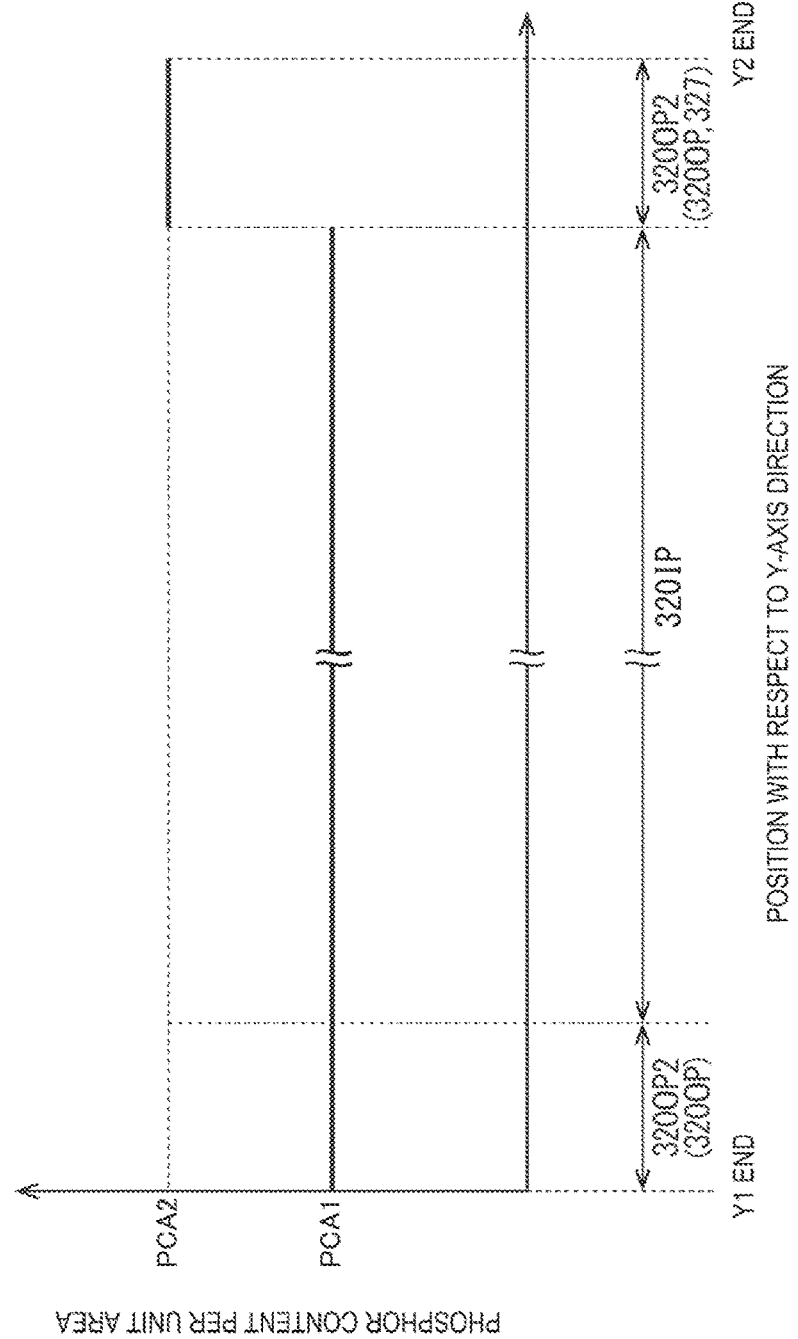
FIG. 16 is a graph illustrating changes in the phosphor content per unit area from Y1 end to Y2 end of the wavelength conversion sheet.

As illustrated in FIG. 15, in the present embodiment, an increased phosphor portion 327 is selectively provided in, among outer peripheral side portions 320OP of a wavelength conversion sheet 320, a pair of short-side portions 320OP1 and a long-side portion 320OP2 of a pair of long-side portions 320OP2 that is on the opposite side from the LED 317 side. The entire area of the outer peripheral side portions 320OP except for the long-side portion 320OP2 on the LED 317 side, i.e., the entire area of the portions along the no-light entry end surfaces of the outer peripheral end surfaces of the light guide plate, not illustrated, constitute the increased phosphor portion 327. Accordingly, in the long-side portion 320OP2 of the outer peripheral side portions 320OP that is on the LED 317 side, as illustrated in FIG. 15 and FIG. 16, the increased phosphor portion 327 is not provided, and the phosphor content per unit area PCA1 is the same as in the central portion 320IP.

<Fifth Embodiment>

A fifth embodiment of the present invention will be described with reference to FIG. 17. The fifth embodiment describes a modification of the first embodiment in the area in which an increased phosphor portion 427 is formed. Redundant descriptions of structures, operations, or effects similar to those of the first embodiment will be omitted.

Figure 17:
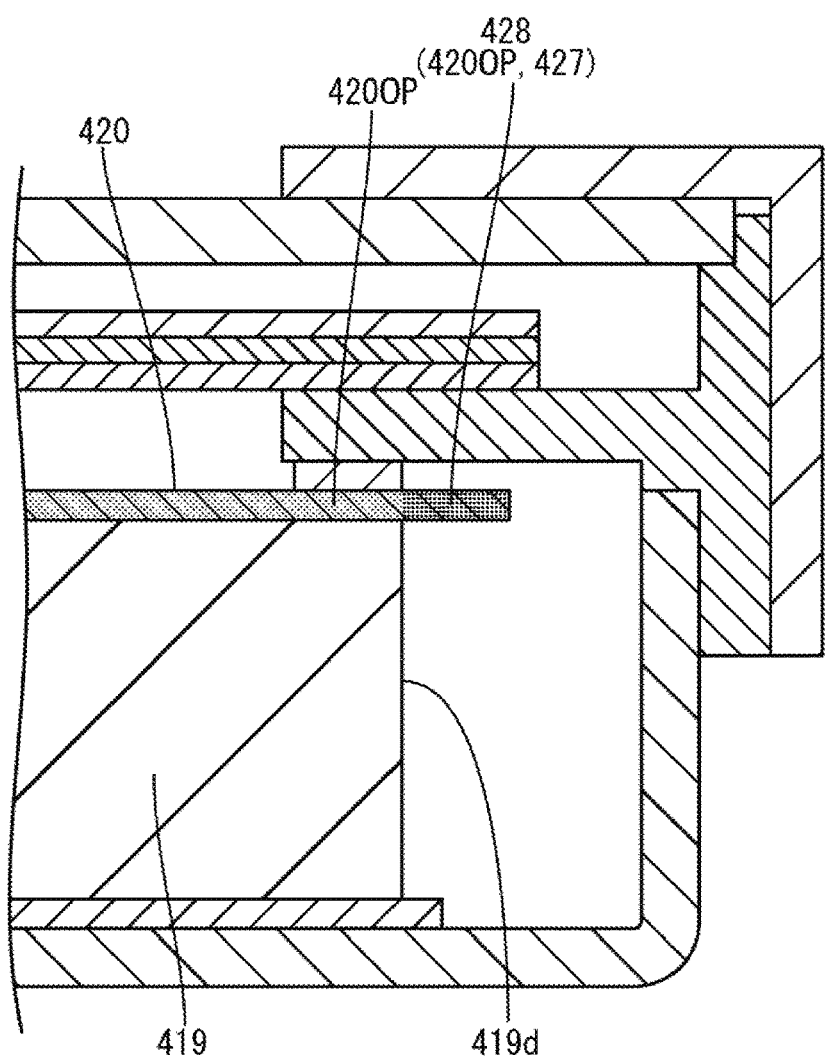
FIG. 17 is a cross sectional view of an end portion of a liquid crystal display device according to a fifth embodiment of the present invention.

As illustrated in FIG. 17, in the present embodiment, the increased phosphor portion 427 is selectively provided in a protruding portion 428 of outer peripheral side portions 420OP of a wavelength conversion sheet 420, the protruding portion 428 protruding outside an outer peripheral end surface (such as a no-light entry end surface 419*d*) of a light guide plate 419. That is, the increased phosphor portion 427 is not provided in a portion of the outer peripheral side portions 420OP that is located on the inside of the outer peripheral end surface of the light guide plate 419 (the inner portion inwardly adjacent to the protruding portion 428), and has an inner end position aligned with the outer peripheral end surface of the light guide plate 419.

<Sixth Embodiment>

A sixth embodiment of the present invention will be described with reference to FIG. 18. The sixth embodiment describes a modification of the first embodiment in the size of a wavelength conversion sheet 520 and the area in which an increased phosphor portion 527 is formed. Redundant descriptions of structures, operations, or effects similar to those of the first embodiment will be omitted.

Figure 18:
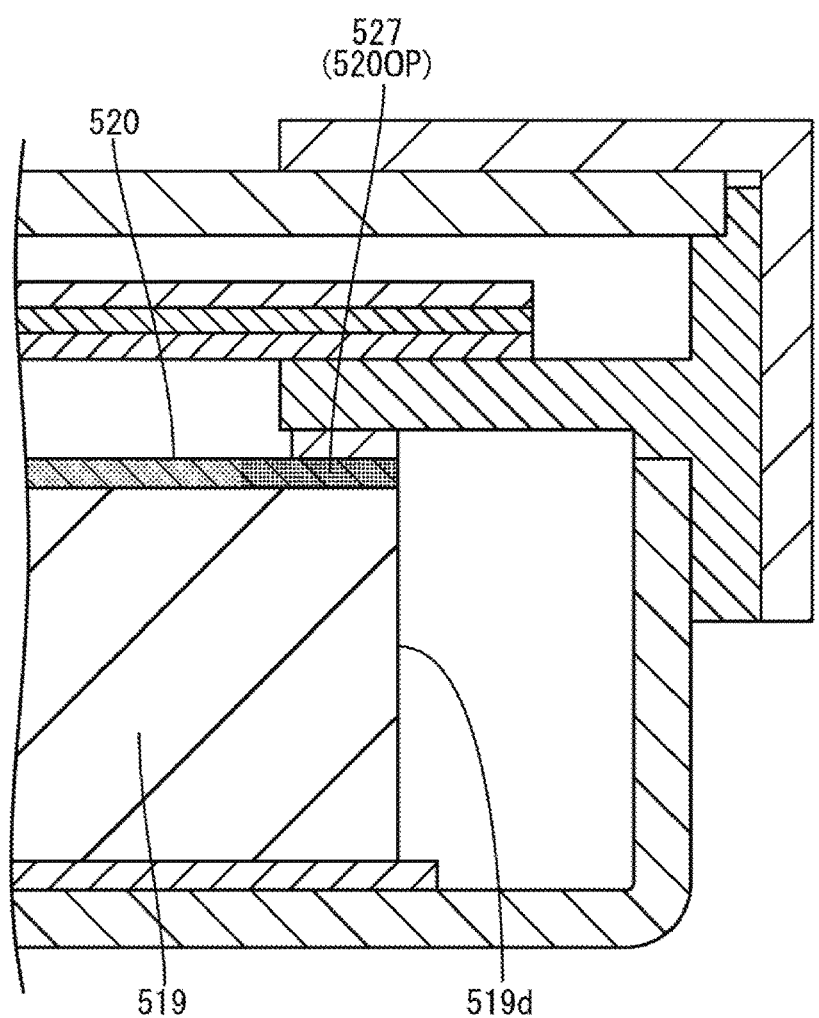
FIG. 18 is a cross sectional view of an end portion of a liquid crystal display device according to a sixth embodiment of the present invention.

As illustrated in FIG. 18, the wavelength conversion sheet 520 according to the present embodiment has an outer peripheral end position which is substantially flush with the outer peripheral end surface (such as a no-light entry end surface 519*d*) of a light guide plate 519. That is, the wavelength conversion sheet 520, as viewed in plan, has a size substantially the same as that of the light guide plate 519, and does not include the protruding portion 28 (see FIG. 4 and FIG. 5) as described in the first embodiment. The increased phosphor portion 527 is provided in outer peripheral side portions 520OP of the wavelength conversion sheet 520, and has an outer end position substantially flush with the outer peripheral end surface of the light guide plate 519. That is, the increased phosphor portion 527 is provided in a portion of the wavelength conversion sheet 520 (outer peripheral side portions 520OP) which is disposed on the inside of the outer peripheral end surface of the light guide plate 519.

<Seventh Embodiment>

A seventh embodiment of the present invention will be described with reference to FIG. 19 or FIG. 20. The seventh embodiment describes a modification of the first embodiment in the configuration of a wavelength conversion sheet 620. Redundant descriptions of structures, operations, or effects similar to those of the first embodiment will be omitted.

Figure 19:
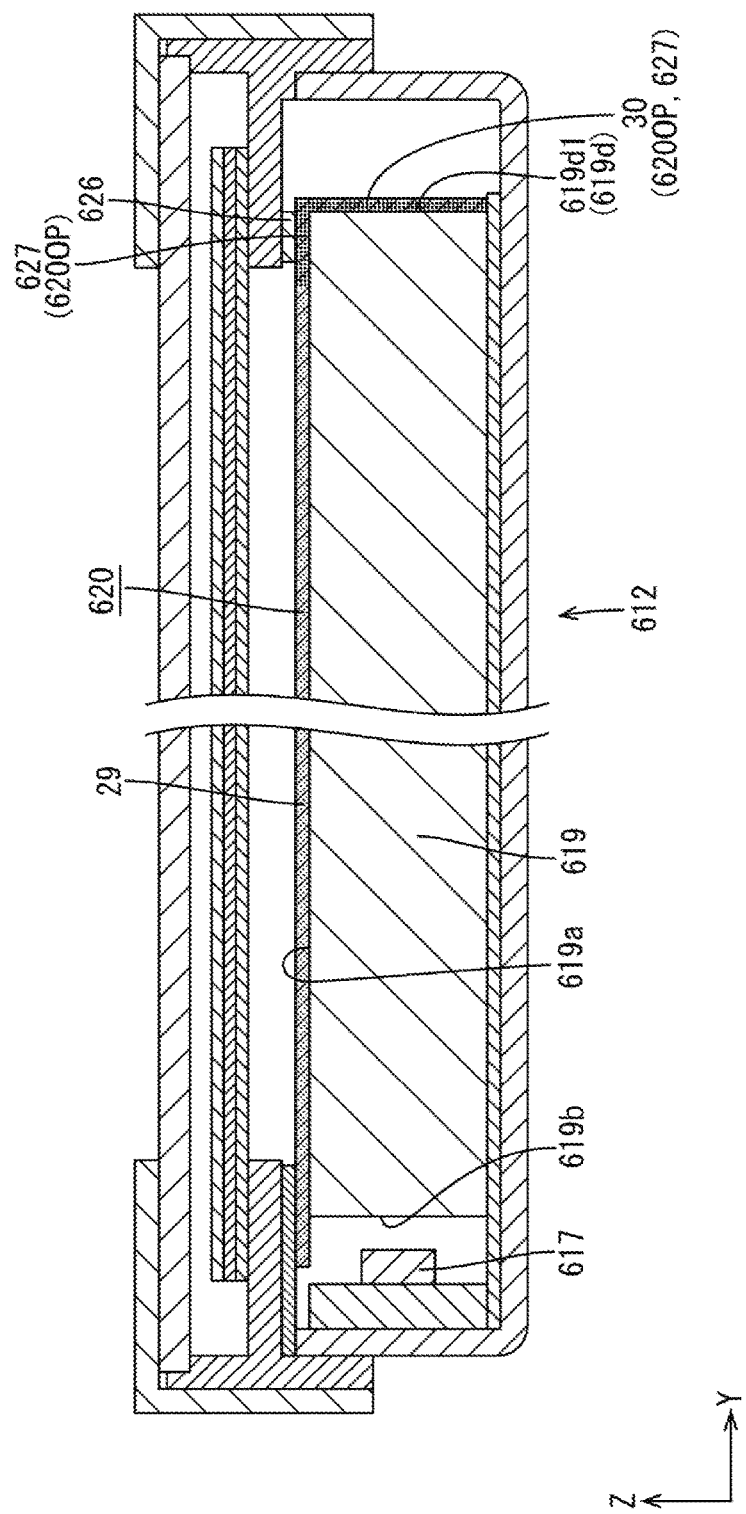
FIG. 19 is a cross sectional view taken along the short-side direction of a liquid crystal display device according to a seventh embodiment of the present invention.
Figure 20:
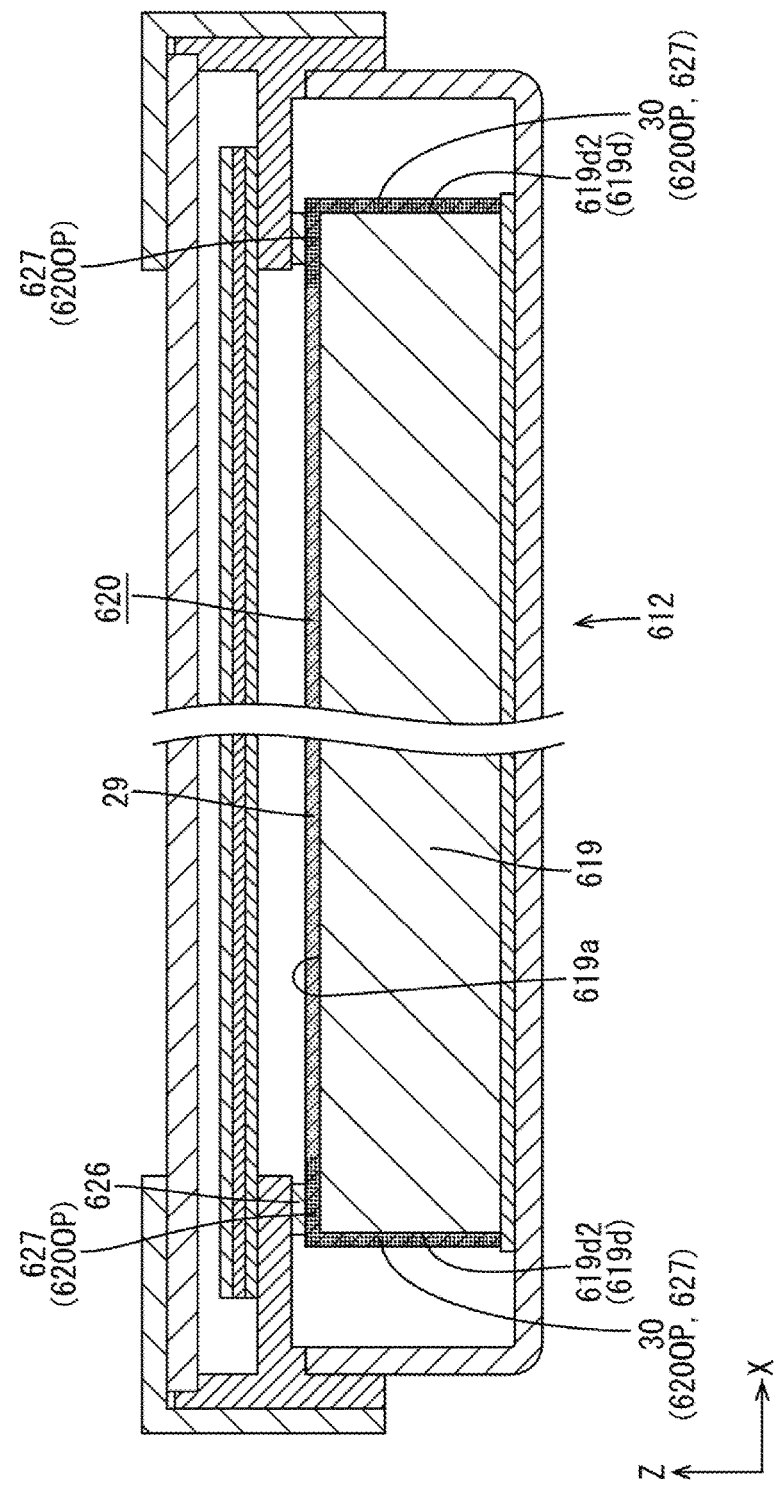
FIG. 20 is a cross sectional view taken along the long-side direction of the liquid crystal display device.

As illustrated in FIG. 19 and FIG. 20, a wavelength conversion sheet 620 according to the present embodiment includes: a plate surface-side wavelength conversion portion 29 which is disposed so as to overlap the front side with respect to a light output plate surface 619*a* of a light guide plate 619; and an end surface-side wavelength conversion portion 30 which is continuous with the plate surface-side wavelength conversion portion 29 and disposed laterally in an overlapping manner with respect to a no-light entry end surface 619*d* of the light guide plate 619. In addition, the end surface-side wavelength conversion portion 30 includes an increased phosphor portion 627 in which the phosphor content per unit area is relatively greater than in the plate surface-side wavelength conversion portion 29. In this configuration, the light emitted from the no-light entry end surface 619*d* of the light guide plate 619 (including retroreflected light) can be wavelength-converted by the phosphor contained in the end surface-side wavelength conversion portion 30. That is, the blue light emitted by LEDs 617, entering a light entry end surface 619*b* of the light guide plate 619, propagating in the light guide plate 619, and exiting the no-light entry end surface 619*d* as is, and the retroreflected light having a blue tint (a high content ratio corresponding to blue light) because of a small number of times of reflections are wavelength-converted into green light and red light by the green phosphor and red phosphor included in the end surface-side wavelength conversion portion 30 when the light passes therethrough. Because the end surface-side wavelength conversion portion 30 includes the increased phosphor portion 627, the light emitted from the no-light entry end surface 619*d* of the light guide plate 619 can be wavelength-converted with higher wavelength conversion efficiency by the increased phosphor portion 627. In this way, even if the light emitted from the no-light entry end surface 619*d* is externally leaked via a gap between a buffer material 626 and the light guide plate 619, for example, the color tint difference in output light is made difficult to occur between the center and the outer peripheral sides of a backlight unit 612, whereby the occurrence of color irregularity is suppressed. In addition, the end surface-side wavelength conversion portion 30 is continuous with the plate surface-side wavelength conversion portion 29. Accordingly, the manufacturing cost of the wavelength conversion sheet 620 is decreased, and the contained phosphors are not readily degraded.

Three end surface-side wavelength conversion portions 30 are provided respectively continuous with the three side portions of the plate surface-side wavelength conversion portion 29 except for the one long-side portion on the LED 617 side (the long-side portion on the opposite side from the LED 617 side, and a pair of short-side portions). The three end surface-side wavelength conversion portions 30 include one that overlaps a no-light entry opposite end surface 619*d*1 which is the no-light entry end surface 619*d* of the light guide plate 619, and ones that respectively overlap a pair of no-light entry side end surfaces 619*d*2). The entire areas of these constitute the increased phosphor portion 627. In addition, the increased phosphor portion 627 is provided in a portion of the plate surface-side wavelength conversion portion 29 that is continuous with each of the end surface-side wavelength conversion portions 30. That is, the increased phosphor portion 627 is provided spanning between, of the wavelength conversion sheet 620, the end surface-side wavelength conversion portions 30 that are the portions disposed on the outside of the no-light entry end surfaces 619*d* which are outer peripheral end surfaces of the light guide plate 619, and inner portions inwardly adjacent to the end surface-side wavelength conversion portions 30. In the present embodiment, the end surface-side wavelength conversion portions 30 and the inner portions inwardly adjacent thereto constitute outer peripheral side portions 620OP of the wavelength conversion sheet 620.

As described above, according to the present embodiment, the wavelength conversion sheet 620 includes: the plate surface-side wavelength conversion portion 29 disposed so as to overlap the light output plate surface 619*a* of the light guide plate 619; and the end surface-side wavelength conversion portions 30 disposed so as to overlap at least a part of the no-light entry end surfaces 619*d* of the light guide plate 619, the end surface-side wavelength conversion portions 30 including the increased phosphor portion 627. In this way, the light emitted from the light output plate surface 619*a* of the light guide plate 619 is wavelength-converted by the plate surface-side wavelength conversion portion 29 of the wavelength conversion sheet 620, whereas the light emitted from the no-light entry end surfaces 619*d* of the light guide plate 619 is wavelength-converted by the end surface-side wavelength conversion portions 30 of the wavelength conversion sheet 620. Because the end surface-side wavelength conversion portions 30 include the increased phosphor portion 627, the light emitted from the no-light entry end surfaces 619*d* of the light guide plate 619 can be more efficiently wavelength-converted by the increased phosphor portion 627, whereby the color irregularity can be suppressed more preferably.

<Eighth Embodiment>

An eighth embodiment of the present invention will be described with reference to FIG. 21. The eighth embodiment describes a modification of the first embodiment in the configuration of an increased phosphor portion 727. Redundant descriptions of structures, operations, or effects similar to those of the first embodiment will be omitted.

Figure 21:
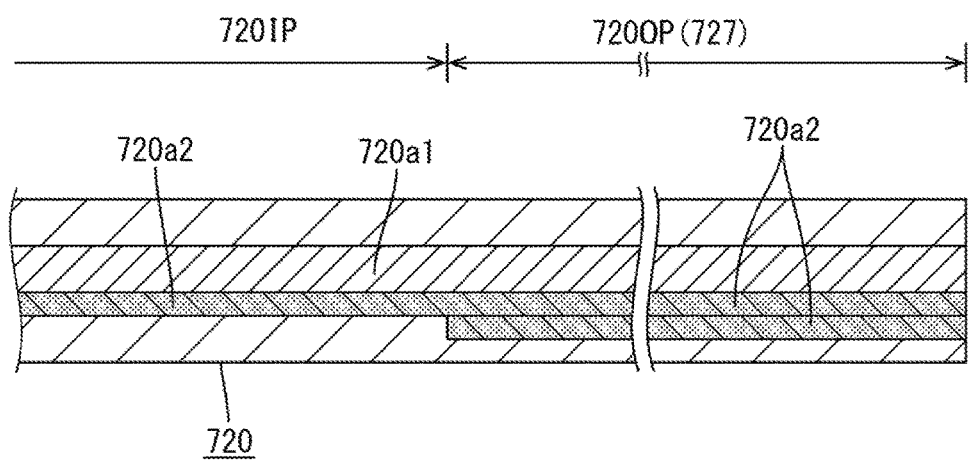
FIG. 21 is a cross sectional view of a wavelength conversion sheet according to an eighth embodiment of the present invention.

As illustrated in FIG. 21, in the wavelength conversion sheet 720 according to the present embodiment, a phosphor layer 720*a*2 in the increased phosphor portion 727 is thicker than the phosphor layer 720*a*2 in a central portion 720IP. In this configuration, too, the phosphor content per unit area in the increased phosphor portion 727 can be made greater than the phosphor content per unit area in the central portion 720IP. The wavelength conversion sheet 720 of this configuration may be preferably manufactured by the following technique. For example, the phosphor layer 720*a*2 is formed by coating the surface of a base member 720*a*1 with a phosphor paint having red phosphor and green phosphor dispersed and compounded therein. In this case, after the phosphor paint is approximately uniformly coated on the entire surface of the base member 720*a*1, the phosphor paint is additionally applied to outer peripheral side portions 720OP of the base member 720*a*1 (increased phosphor portion 727). The present embodiment may be combined with the third embodiment.

As described above, according to the present embodiment, the wavelength conversion sheet 720 includes the phosphor layer 720*a*2 having containing phosphor, where the phosphor layer 720*a*2 in the increased phosphor portion 727 is thicker than the phosphor layer 720*a*2 in the central portion 720IP. In this way, during the manufacture of the wavelength conversion sheet 720, the increased phosphor portion 727 can be provided by, for example, coating at least a part of the outer peripheral side portions 720OP with more phosphor than in the central portion 720IP.

<Ninth Embodiment>

A ninth embodiment of the present invention will be described with reference to FIG. 22. The ninth embodiment describes a modification of the first embodiment in the manner in which the phosphor content per unit area is varied in an increased phosphor portion 827. Redundant descriptions of structures, operations, or effects similar to those of the first embodiment will be omitted.

Figure 22:
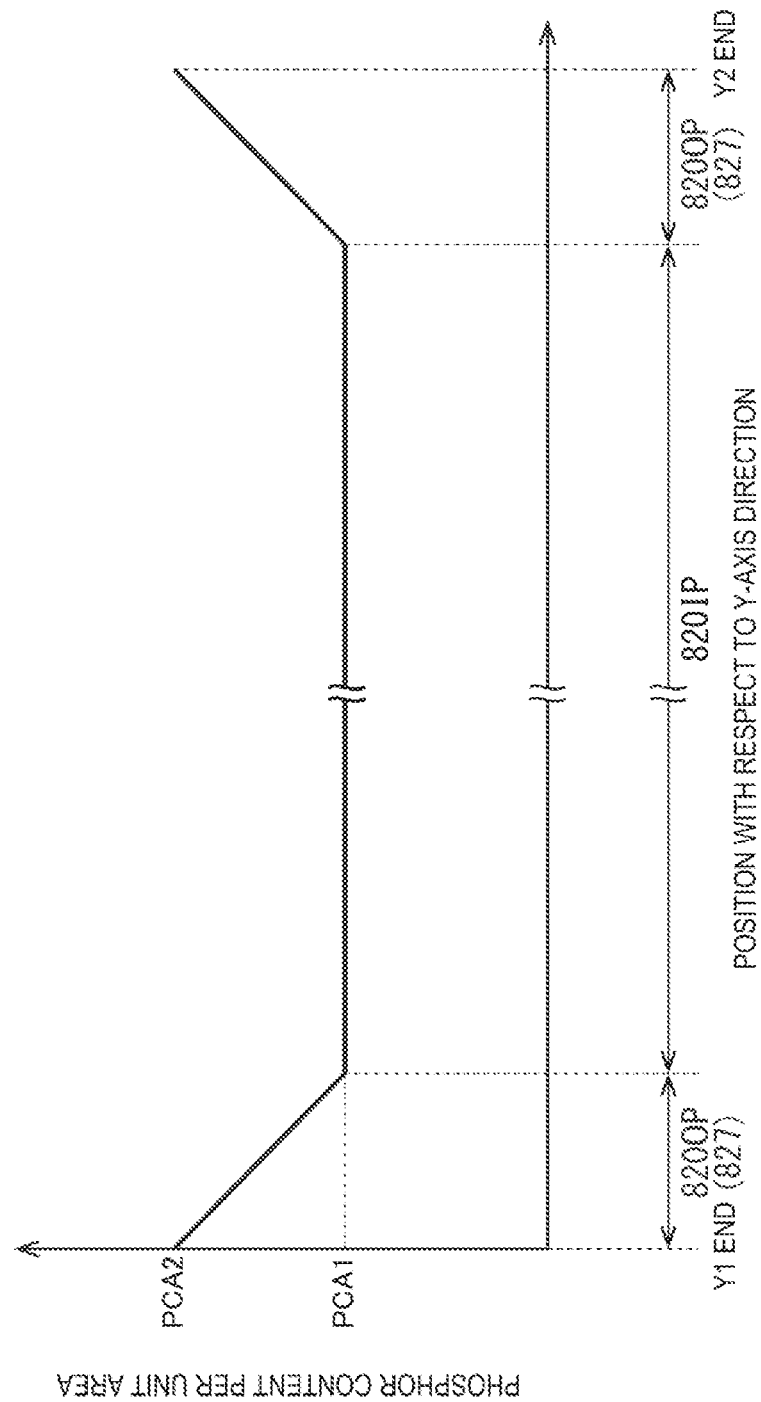
FIG. 22 is a graph illustrating changes in the phosphor content per unit area from Y1 end to Y2 end of a wavelength conversion sheet according to a ninth embodiment of the present invention.

As illustrated in FIG. 22, the increased phosphor portion 827 according to the present embodiment is configured such that the phosphor content per unit area is continuously and gradually increased from the inner end position to the outer end position in outer peripheral side portions 820OP. That is, in the increased phosphor portion 827, the phosphor content per unit area becomes greater with increasing distance from a central portion 820IP, and conversely becomes smaller with decreasing distance from the central portion 820IP. In the increased phosphor portion 827, the phosphor content per unit area is varied in a sloped manner (linearly).

<Tenth Embodiment>

A tenth embodiment of the present invention will be described with reference to FIG. 23. The tenth embodiment describes a modification of the ninth embodiment in the manner in which the phosphor content per unit area is varied in an increased phosphor portion 927. Redundant descriptions of structures, operations, or effects similar to those of the ninth embodiment will be omitted.

Figure 23:
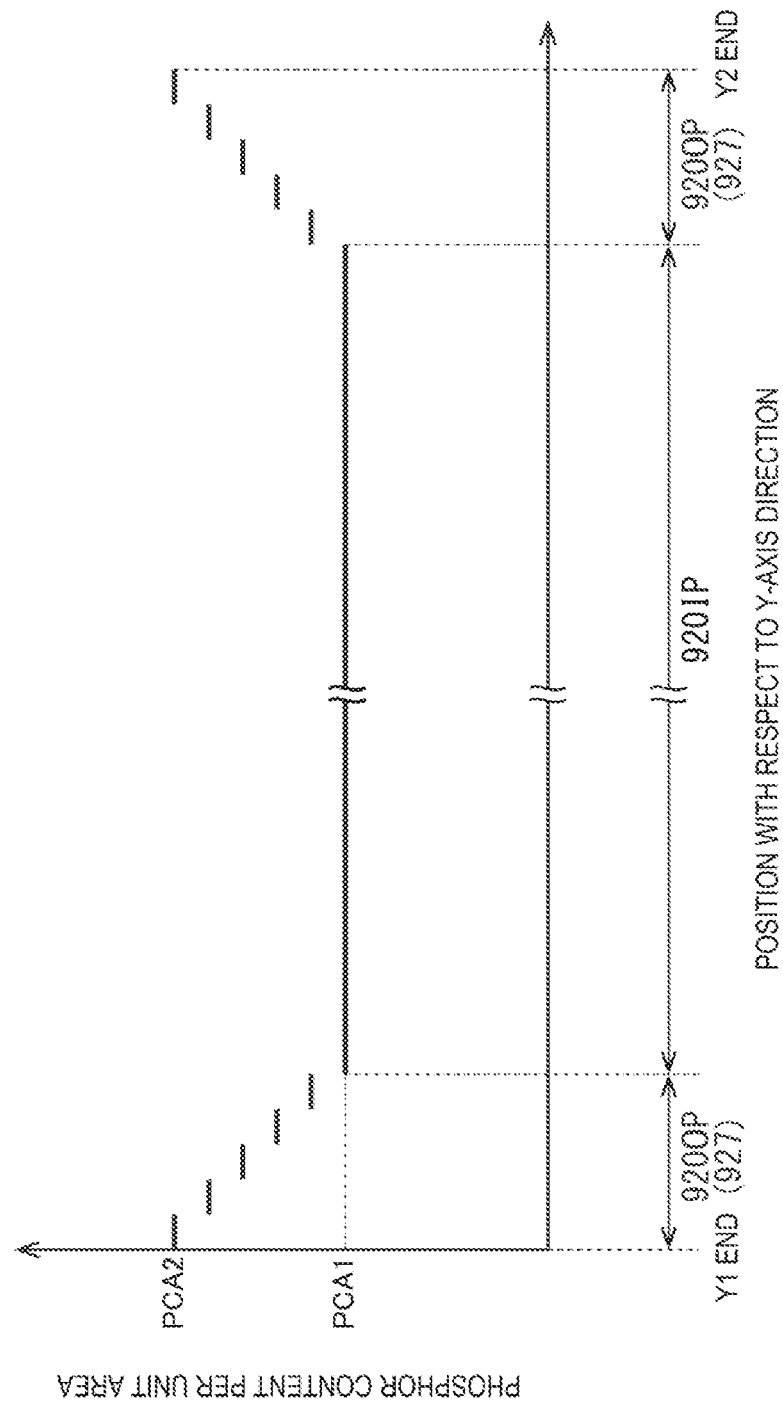
FIG. 23 is a graph illustrating changes in the phosphor content per unit area from Y1 end to Y2 end of a wavelength conversion sheet according to a tenth embodiment of the present invention.

As illustrated in FIG. 23, the increased phosphor portion 927 according to the present embodiment is configured such that the phosphor content per unit area is increased in a stepwise manner and successively from an inner end position to an outer end position of outer peripheral side portions 920OP (with increasing distance from the central portion 920IP). In the increased phosphor portion 927, the phosphor content per unit area is varied in a multi-stepwise manner.

<Other Embodiments>

The present invention is not limited to the above embodiments explained in the above description and described with reference to the drawings. The following embodiments may be included in the technical scope of the present invention, for example.

(1) In the foregoing embodiments (except for the sixth embodiment), the configurations have been described by way of example in which the entire areas of the protruding portion of the outer peripheral side portions of the wavelength conversion sheet constitute the increased phosphor portion. However, only a part of the protruding portion may constitute the increased phosphor portion. In this case, a protruding tip-end side portion of the protruding portion may preferably selectively constitute the increased phosphor portion.

(2) In the foregoing embodiments (except for the fifth and sixth embodiments), the configuration has been described in which the increased phosphor portion is provided spanning between the protruding portion of the outer peripheral side portions of the wavelength conversion sheet and the portion on the inside thereof. The specific area ratio of the protruding portion and the portion on the inside thereof in the increased phosphor portion may be modified as appropriate in ways other than illustrated in the drawings. Further, the specific amount of protrusion of the protruding portion from the outer peripheral end surfaces of the light guide plate may be modified as appropriate in ways other than illustrated in the drawings.

(3) In the foregoing embodiments (except for the fifth and sixth embodiments), the configuration has been described in which the outer peripheral side portions of the wavelength conversion sheet includes the protruding portion throughout the periphery. It is also possible to adopt a configuration in which the outer peripheral side portions of the wavelength conversion sheet include the protruding portion partially with respect to the circumferential direction. For example, a configuration may be adopted in which, of the outer peripheral side portions of the wavelength conversion sheet, the portion along the light entry end surface of the light guide plate (one long-side portion on the light source side) has no protruding portion, but the portions along the no-light entry end surfaces of the light guide plate (one long-side portion along the no-light entry opposite end surface, and a pair of short-side portions along the no-light entry side end surfaces) have the protruding portions. In this case, too, the entire area of the protruding portion may preferably, but not necessarily, constitute the increased phosphor portion.

(4) In the foregoing embodiments, the case has been described in which the side portions constituting the outer peripheral side portions of the wavelength conversion sheet constitute the increased phosphor portion along the entire lengths thereof in their extending directions. However, the side portions constituting the outer peripheral side portions of the wavelength conversion sheet may also constitute the increased phosphor portion partially with respect to the extending directions thereof.

(5) In the foregoing embodiments, the case has been described by way of example in which the wavelength conversion layer constituting the wavelength conversion sheet is formed by coating the base member surface with a phosphor layer. However, it is also possible to form the wavelength conversion layer by, for example, dispersing and compounding the phosphor in the base member material.

(6) In the third embodiment, the case has been described in which, among the outer peripheral side portions of the wavelength conversion sheet, a pair of short-side portions constitute the increased phosphor portion. However, a pair of long-side portions among the outer peripheral side portions of the wavelength conversion sheet may also constitute the increased phosphor portion.

(7) In the third embodiment, the case has been described in which, among the outer peripheral side portions of the wavelength conversion sheet, a pair of short-side portions constitute the increased phosphor portion. However, either one of the short-side portions may also constitute the increased phosphor portion. Similarly, only one of the pair of long-side portions among the outer peripheral side portions of the wavelength conversion sheet may also constitute the increased phosphor portion. In this case, of the pair of long-side portions, the long-side portion along the no-light entry opposite end surface of the light guide plate may preferably constitute the increased phosphor portion. In this way, the light emitted from the no-light entry opposite end surface can be more efficiently wavelength-converted by the increased phosphor portion.

(8) In the sixth embodiment, the configuration has been described by way of example in which the outer peripheral end position of the wavelength conversion sheet is substantially flush with the outer peripheral end surfaces of the light guide plate. However, the present invention is also applicable in a configuration in which the outer peripheral end position of the wavelength conversion sheet is disposed on the inside of the outer peripheral end surfaces of the light guide plate.

(9) In the seventh embodiment, the case has been described by way of example in which the entire area of the end surface-side wavelength conversion portion of the wavelength conversion sheet constitutes the increased phosphor portion. However, a part of the end surface-side wavelength conversion portion may also constitute the increased phosphor portion. For example, the end surface-side wavelength conversion portion overlapping the no-light entry opposite end surface of the light guide plate may selectively constitute the increased phosphor portion, or a pair of end surface-side wavelength conversion portions overlapping the pair of no-light entry side end surfaces may selectively constitute the increased phosphor portion. In addition, of each of the end surface-side wavelength conversion portions, only a part with respect to the height direction of the no-light entry end surface of the light guide plate may also constitute the increased phosphor portion, or only a part with respect to the length direction of the no-light entry end surface of the light guide plate may also constitute the increased phosphor portion.

(10) In the seventh embodiment, the configuration has been described by way of example in which the wavelength conversion sheet includes the end surface-side wavelength conversion portion overlapping the no-light entry opposite end surface of the light guide plate, and a pair of end surface-side wavelength conversion portions overlapping a pair of no-light entry side end surfaces. However, it is also possible to remove one or two of the three end surface-side wavelength conversion portions.

(11) In the ninth embodiment, the configuration has been described by way of example in which the phosphor content per unit area in the increased phosphor portion is linearly varied. However, it is also possible to adopt a configuration in which the phosphor content per unit area in the increased phosphor portion is varied in a curved manner (for example, in an arched curve manner).

(12) The configuration described in the second embodiment may be combined with the configurations described in the third to tenth embodiments.

(13) The configuration described in the third embodiment may be combined with the configurations described in the fifth to tenth embodiments.

(14) The configuration described in the fourth embodiment may be combined with the configuration described in the fifth to tenth embodiments.

(15) The configuration described in the fifth embodiment may be combined with the configurations described in the seventh to tenth embodiments.

(16) The configuration described in the sixth embodiment may be combined with the configurations described in the eighth to tenth embodiments.

(17) The configuration described in the seventh embodiment may be combined with the configurations described in the eighth to tenth embodiments.

(18) The configuration described in the eighth embodiment may be combined with the configurations described in the ninth and tenth embodiments.

(19) In the foregoing embodiments, the configuration has been described by way of example in which four optical members are provided. However, the number of the optical members may be modified to be not more than three or not less than five. The type of the optical members used other than the wavelength conversion sheet may also be modified as appropriate. For example, a diffusion sheet may be used. The specific order in which the optical members other than the wavelength conversion sheet are stacked may also be modified as appropriate.

(20) In the foregoing embodiments, the configuration has been described by way of example in which the wavelength conversion sheet is disposed directly on the front side with respect to the light guide plate. However, it is also possible to stack one or more other optical members (such as a microlens sheet, a prism sheet, or a reflection type polarizing sheet) between the light guide plate and the wavelength conversion sheet.

(21) In the foregoing embodiments, the LEDs and the LED substrate are disposed so as to oppose one long-side end surface of the light guide plate. However, the LEDs and the LED substrate may be disposed so as to oppose one short-side end surface of the light guide plate.

(22) In the foregoing embodiments, the LED and the LED substrate are disposed so as to oppose one end surface of the light guide plate. However, the LED and the LED substrate may be disposed so as to oppose a pair of the long-side end surfaces or a pair of short-side end surfaces of the light guide plate. It is also possible to dispose the LED and the LED substrate so as to oppose arbitrary three end surfaces of the light guide plate. It is also possible to dispose the LED and the LED substrate so as to oppose all four end surfaces of the light guide plate.

(23) In the foregoing embodiments, the case has been described in which the LEDs emitting single-color light of blue are used as the light source. However, it is also possible to use as the light source an LED emitting light of a color other than blue. In this case, the color exhibited by the phosphor contained in the wavelength conversion sheet may be modified in accordance with the color of the light of the LED. For example, when an LED emitting magenta light is used, the phosphor contained in the wavelength conversion sheet may include green phosphor exhibiting the complementary color of green to magenta, whereby the illumination light (output light) of the backlight unit can be made white.

(24) Other than the above-described (23), when an LED emitting violet light is used, the phosphor contained in the wavelength conversion sheet may include green phosphor and yellow phosphor to provide the complementary color of yellow green to violet, whereby the illumination light (output light) of the backlight unit can be made white.

(25) Other than the above-described (23) and (24), when an LED emitting cyan light is used, the phosphor contained in the wavelength conversion sheet may include red phosphor exhibiting the complementary color of red to cyan, whereby the illumination light (output light) of the backlight unit can be made white.

(26) In the foregoing embodiments, the case has been described in which the wavelength conversion sheet includes green phosphor and red phosphor. However, it is also possible to adopt a configuration in which the wavelength conversion sheet includes only yellow phosphor, or a configuration in which red phosphor or green phosphor is included in addition to yellow phosphor.

(27) In the foregoing embodiments, the case has been described by way of example in which the quantum dot phosphor used as the phosphor included in the wavelength conversion sheet is of core-shell type including CdSe and ZnS. It is also possible to use a core type quantum dot phosphor having a unitary internal composition. For example, it is possible to use a material in which Zn, Cd, Hg, Pb or the like that becomes a divalent cation and O, S, Se, Te or the like that becomes a divalent anion are combined (CdSe, CdS, ZnS) individually. It is also possible to use a material in which Ga, In or the like that becomes a trivalent cation and P, As, Sb or the like that becomes a trivalent anion are combined (such as InP (indium phosphide) or GaAs (gallium arsenide)), or chalcopyrite type compound (such as $CuInSe_2$) individually. Other than the core-shell type or the core type quantum dot phosphor, it is also possible to use an alloy type quantum dot phosphor. Further, it is also possible to use a quantum dot phosphor that does not contain cadmium.

(28) In the foregoing embodiments, the case has been described by way of example in which the quantum dot phosphor used as the phosphor included in the wavelength conversion sheet is of the core-shell type of CdSe and ZnS. It is also possible to use a core-shell type quantum dot phosphor including a combination of other materials.

(29) In the foregoing embodiments, the configuration has been described by way of example in which the wavelength conversion sheet contains quantum dot phosphor. However, the wavelength conversion sheet may contain other types of phosphor. For example, sulfide phosphor may be used as the phosphor contained in the wavelength conversion sheet. Specifically, it is possible to use $SrGa_2S_4{:}Eu^{2+}$ as green phosphor and $(Ca, Sr, Ba)S{:}Eu^{2+}$ as red phosphor.

(30) Other than the above-described (29), the green phosphor contained in the wavelength conversion sheet may include $(Ca, Sr, Ba)_3SiO_4{:}Eu^{2+}$, $\beta\text{-SiAlON}{:}Eu^{2+}$, or $Ca_3Sc_2Si_3O_{12}{:}Ce^{3+}$, for example. The red phosphor contained in the wavelength conversion sheet may include $(Ca, Sr, Ba)_2SiO_5N_8{:}Eu^{2+}$ or $CaAlSiN_3{:}Eu^{2+}$, for example. The yellow phosphor contained in the wavelength conversion sheet may include $(Y, Gd)_3(Al, Ga)_5O_{12}{:}Ce^{3+}$ (generally known as $YAG{:}Ce^{3+}$), $\alpha\text{-SiAlON}{:}Eu^{2+}$, or $(Ca, Sr, Ba)_3SiO_4{:}Eu^{2+}$, for example. It is also possible to use, as the phosphor contained in the wavelength conversion sheet, double fluoride phosphor (such as manganese-activated potassium fluorosulfide ($K_2TiF_6$)).

(31) Other than the above-described (29) and (30), as the phosphor contained in the wavelength conversion sheet, organic phosphor may be used. As the organic phosphor, for example, a low molecular weight organic phosphor including triazole or oxadiazole as a basic skeleton may be used.

(32) Other than the above-described (29), (30), and (31), it is also possible to use, as the phosphor contained in the wavelength conversion sheet, a phosphor that performs wavelength conversion by energy transfer via dressed photon (near-field light). Specifically, as this type of phosphor, it is preferable to use a phosphor in which a DCM dye is dispersed and mixed in a zinc oxide quantum dot (ZnO-QD) measuring 3 nm to 5 nm (preferably about 4 nm) in diameter.

(33) The LED emission spectrum (such as the numerical value of peak wavelength, or the numerical value of the half value width of peak) and the emission spectrum of the phosphor included in the phosphor layer (such as the numerical value of peak wavelength, or the numerical value of half value width of peak) may be modified as appropriate from the foregoing embodiments.

(34) In the foregoing embodiments, the case has been described in which InGaN is used as the material of the LED elements constituting the LEDs. It is also possible to use GaN, AlGaN, GaP, ZnSe, ZnO, AlGaInP and the like as the other materials of the LED elements.

(35) In the foregoing embodiments, the case has been described by way of example in which the chassis is made of metal. However, it is also possible to make the chassis from synthetic resin.

(36) In the foregoing embodiments, the configuration has been described byway of example in which the optical members other than the wavelength conversion sheet (the microlens sheet, the prism sheet, and the reflection type polarizing sheet) are placed on the front side with respect to the frame-shaped portion of the frame, with an interval provided from the wavelength conversion sheet. It is also possible to adopt a configuration in which the optical members other than the wavelength conversion sheet are directly placed on the front side with respect to the wavelength conversion sheet. In this case, it may be preferable, but not necessarily, to adopt a configuration in which the frame-shaped portion of the frame presses, from the front side, the optical member disposed on top on the front side.

(37) In the foregoing embodiments, the LEDs are used as the light source. However, it is also possible to use other light sources, such as organic EL.

(38) In the foregoing embodiments, the case has been described by way of example in which the liquid crystal panel and the chassis are installed in an upright state with the short-side direction aligned with the vertical direction. However, the present invention also includes the liquid crystal panel and the chassis being installed in an upright state with the long-side direction aligned with the vertical direction.

(39) In the foregoing embodiments, TFTs are used as the switching elements of the liquid crystal display device. However, the present invention is also applicable to a liquid crystal display device using switching elements other than TFT (for example, thin-film diode (TFD)). The present invention is also applicable to not just a liquid crystal display device for color display but also a liquid crystal display device for black and white display.

(40) In the foregoing embodiments, a transmissive type liquid crystal display device has been described by way of example. However, the present invention is applicable to other types, such as a reflection type liquid crystal display device or a semi-transmissive type liquid crystal display device.

(41) In the foregoing embodiments, a liquid crystal display device in which a liquid crystal panel is used as a display panel has been described by way of example. However, the present invention is applicable to display devices using other types of display panels.

(42) In the foregoing embodiments, a television device equipped with a tuner has been described by way of example. However, the present invention is also applicable to display devices having no tuners. Specifically, the present invention is applicable to a liquid crystal display device used as an electronic signboard (digital signage) or an electronic blackboard.

EXPLANATION OF SYMBOLS

10: Liquid crystal display device (Display device)
11: Liquid crystal panel (Display panel)
12, 612: Backlight unit (Lighting device)
17, 317, 617: LED (Light source)
19, 419, 519, 619: Light guide plate
19a, 619a: Light output plate surface
19b, 619b: Light entry end surface
19d, 419d, 519d: No-light entry end surface

20, 120, 220, 320, 420, 520, 620, 720: Wavelength conversion sheet (Wavelength conversion member)
20a2, 720a2: Phosphor layer
20IP, 120IP, 220IP, 20IP, 320IP, 720IP, 820IP, 920IP: Central portion
20OP, 120OP, 220OP, 320OP, 420OP, 520OP, 620OP, 720OP, 820OP, 920OP: Outer peripheral side portion
20OP1, 120OP1, 220OP1, 320OP1: Short-side portion (Side portion)
20OP2, 120OP2, 220OP2, 320OP2: Long-side portion (Side portion)
27, 127, 227, 327, 427, 527, 627, 727, 827, 927: Increased phosphor portion
28, 428: Protruding portion
29: Plate surface-side wavelength conversion portion
30: End surface-side wavelength conversion portion
120OP1A: End portion
120OP1B: Central portion
120OP2A: End portion
120OP2B: Central portion

The invention claimed is:

1. A lighting device, comprising:
a light source;
a light guide plate including a light entry end surface on at least a part of an outer peripheral end surface, the light entry end surface through which light from the light source enters, the light guide plate including a light output plate surface on a plate surface, the light output plate surface through which the light exits; and
a wavelength conversion member disposed so as to overlap the light output plate surface of the light guide plate and containing a phosphor for wavelength-converting the light from the light source, the wavelength conversion member including an increase phospohor portion on at least a part of an outer peripheral side portion thereof, the increased phosphor portion having a phosphor content per unit area that is greater than that in a central portion of the wavelength conversion member, wherein
the light guide plate includes a no-light entry end surface in a portion of the outer peripheral end surface except for the light entry end surface, the light from the light source does not directly enter through the no-light entry end surface,
the wavelength conversion member includes the increased phosphor portion in at least a part of a portion of the outer peripheral side portion along the no-light entry end surface,
the wavelength conversion member includes a plate surface-side wavelength conversion portion disposed so as to overlap the light output plate surface of the light guide plate, and an end surface-side wavelength conversion portion disposed so as to overlap at least a part of the no-light entry end surface of the light guide plate, and
the end surface-side wavelength conversion portion includes the increased phosphor portion.

2. A display device comprising:
the lighting device according to claim 1; and
a display panel that displays an image by utilizing light emitted from the lighting device.

3. A television device comprising the display device according to claim 2.

4. A lighting device, comprising:
a light source,
a light guide plate including a light entry end surface on at least a part of an outer peripheral end surface, the light entry end surface through which light from the light source enters, the light guide plate including a light output plate surface on a plate surface, the light output plate surface through which the light exits; and a wavelength conversion member disposed so as to overlap the light output plate surface of the light guide plate and containing a phosphor for wavelength-converting the light from the light source, the wavelength conversion member including an increase phospohor portion on at least a part of an outer peripheral side portion thereof, the increased phosphor portion having a phosphor content per unit area that is greater than that in a central portion of the wavelength conversion member, wherein the light guide plate includes a no-light entry end surface in a portion of the outer peripheral end surface except for the light entry end surface, the light from the light source does not directly enter through the no-light entry end surface, the wavelength conversion member includes the increased phosphor portion in at least a part of a portion of the outer peripheral side portion along the no-light entry end surface, and the wavelength conversion member includes the increased phosphor portion in an entire area of the portion of the outer peripheral side portion along the no-light entry end surface.

5. A display device comprising:

the lighting device according to claim 4; and a display panel that displays an image by utilizing light emitted from the lighting device.

6. A television device comprising the display device according to claim 5.

* * * * *